_(12)_ United States Patent
Hakamada et al.

(10) Patent No.: US 7,635,182 B2
(45) Date of Patent: *Dec. 22, 2009

(54) RECORDING METHOD, INK CARTRIDGE, AND IMAGE-FORMING METHOD

(75) Inventors: Shinichi Hakamada, Kawasaki (JP); Mikio Sanada, Yokohama (JP); Takashi Imai, Yokohama (JP); Yasuhiro Nito, Yokohama (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 705 days.

This patent is subject to a terminal disclaimer.

(21) Appl. No.: 11/314,010

(22) Filed: Dec. 22, 2005

(65) Prior Publication Data

US 2006/0103704 A1    May 18, 2006

Related U.S. Application Data

(63) Continuation of application No. PCT/JP2005/012289, filed on Jun. 28, 2005.

(30) Foreign Application Priority Data

Jun. 28, 2004    (JP)    ............................. 2004-190546

(51) Int. Cl.
   *G01D 11/00*    (2006.01)
(52) U.S. Cl. ........................ 347/100; 347/95; 106/31.27
(58) Field of Classification Search ................. 347/100, 347/95, 96, 101, 84, 85; 106/31.6, 31.13, 106/31.27; 523/160
   See application file for complete search history.

(56) References Cited

U.S. PATENT DOCUMENTS 5,451,251 A    9/1995    Mafune et al. ............ 106/22 H (Continued)

FOREIGN PATENT DOCUMENTS

EP    1 148 103 A1    10/2001

(Continued)

OTHER PUBLICATIONS

International Preliminary Report on Patentability and Written Opinion of the International Searching Authority for PCT/JP2005/012289, with translations (14 pages).

*Primary Examiner*—Manish S Shah
(74) *Attorney, Agent, or Firm*—Fitzpatrick, Cella, Harper & Scinto

(57) ABSTRACT

A recording method is provided which enables formation of an image with high image density and low graininess. The recording is conducted by using a recording method using a first aqueous ink for higher-density recording and a second aqueous ink for lower-density recording, characterized in that the first aqueous ink includes at least water, a water-insoluble coloring material, and plurality of water-soluble organic solvents, the plurality of water-soluble organic solvents including a good medium or good mediums for the water-insoluble coloring material and a poor medium or poor mediums for the water-insoluble coloring material, the ratio B/A in the second aqueous ink being less than the ratio B/A in the first aqueous ink, where A denotes the total content (mass %) of good medium based on the total mass of the aqueous ink and B denotes the total content (mass %) of poor medium based on the total mass of the aqueous ink; and the second aqueous ink has the same hue as the first aqueous ink.

12 Claims, 10 Drawing Sheets

U.S. PATENT DOCUMENTS

| | | | | |
|---|---|---|---|---|
| 5,571,313 | A | 11/1996 | Mafune et al. | 106/22 H |
| 5,782,967 | A | 7/1998 | Shirota et al. | 106/31.58 |
| 5,911,815 | A | 6/1999 | Yamamoto et al. | 106/31.27 |
| 6,027,210 | A | 2/2000 | Kurabayashi et al. | 347/100 |
| 6,036,307 | A | 3/2000 | Hakamada et al. | 377/106 |
| 6,062,674 | A | 5/2000 | Inui et al. | 347/43 |
| 6,174,354 | B1 | 1/2001 | Takizawa et al. | 106/31.43 |
| 6,214,963 | B1 | 4/2001 | Noguchi et al. | 528/71 |
| 6,221,141 | B1 | 4/2001 | Takada et al. | 106/31.6 |
| 6,280,513 | B1 | 8/2001 | Osumi et al. | 106/31.6 |
| 6,332,919 | B2 | 12/2001 | Osumi et al. | 106/31.6 |
| 6,367,923 | B1 | 4/2002 | Koitabashi | 347/101 |
| 6,375,317 | B1 | 4/2002 | Osumi et al. | 347/100 |
| 6,387,168 | B1 | 5/2002 | Koitabashi et al. | 106/31.6 |
| 6,398,355 | B1 | 6/2002 | Shirota et al. | 347/100 |
| 6,425,662 | B1 | 7/2002 | Teraoka et al. | 347/100 |
| 6,474,803 | B1 | 11/2002 | Shirota et al. | 347/100 |
| 6,511,534 | B1 | 1/2003 | Mishina et al. | 106/31.33 |
| 6,552,156 | B2 | 4/2003 | Noguchi et al. | 528/71 |
| 6,670,409 | B2 | 12/2003 | Yatake | 523/160 |
| 6,676,254 | B2 | 1/2004 | Nagashima et al. | 347/100 |
| 6,698,876 | B2 | 3/2004 | Sato et al. | 347/100 |
| 6,706,105 | B2 | 3/2004 | Takada et al. | 106/31.6 |
| 6,719,403 | B2 | 4/2004 | Kanda et al. | 347/40 |
| 6,723,137 | B1 | 4/2004 | Hakamada et al. | 8/549 |
| 6,733,120 | B2 | 5/2004 | Ogasawara et al. | 347/100 |
| 6,846,353 | B2 | 1/2005 | Sano et al. | 106/31.6 |
| 6,874,881 | B2 | 4/2005 | Suzuki et al. | 347/100 |
| 6,929,362 | B2 | 8/2005 | Takada et al. | 347/100 |
| 6,932,465 | B2 | 8/2005 | Nito et al. | 347/96 |
| 6,935,732 | B2 | 8/2005 | Takada et al. | 347/96 |
| 7,005,461 | B2 | 2/2006 | Sanada et al. | 523/160 |
| 7,029,109 | B2 | 4/2006 | Shirota et al. | 347/100 |
| 7,055,943 | B2 | 6/2006 | Suzuki et al. | 347/100 |
| 7,128,779 | B2 | 10/2006 | Osumi et al. | 106/31.52 |
| 7,141,105 | B2 | 11/2006 | Udagawa et al. | 106/31.49 |
| 7,144,449 | B2 | 12/2006 | Udagawa et al. | 106/31.15 |
| 7,160,376 | B2 | 1/2007 | Watanabe et al. | 106/31.6 |
| 7,276,112 | B2 * | 10/2007 | Tokuda et al. | 106/31.6 |
| 2002/0038613 | A1 * | 4/2002 | Yatake | 106/31.6 |
| 2002/0067393 | A1 * | 6/2002 | Kanda et al. | 347/41 |
| 2003/0144377 | A1 | 7/2003 | Sano et al. | 523/160 |
| 2004/0027404 | A1 | 2/2004 | Nagashima et al. | 347/8 |
| 2004/0231554 | A1 | 11/2004 | Udagawa et al. | 106/31.15 |
| 2005/0005818 | A1 | 1/2005 | Sato et al. | 106/31.27 |
| 2005/0024458 | A1 | 2/2005 | Sanada et al. | 347/100 |
| 2005/0088501 | A1 | 4/2005 | Nagashima et al. | 347/100 |
| 2005/0195243 | A1 | 9/2005 | Nagashima et al. | 347/54 |
| 2005/0204955 | A1 | 9/2005 | Nagashima et al. | 106/31.59 |
| 2005/0219341 | A1 | 10/2005 | Nito et al. | 347/100 |
| 2006/0000386 | A1 | 1/2006 | Hakamada et al. | 106/31.13 |
| 2006/0007288 | A1 | 1/2006 | Takada et al. | 347/100 |
| 2006/0007289 | A1 | 1/2006 | Nito et al. | 347/100 |
| 2006/0012657 | A1 | 1/2006 | Nagashima et al. | 347/100 |
| 2006/0066699 | A1 | 3/2006 | Tokuda et al. | 347/100 |
| 2006/0089424 | A1 | 4/2006 | Sanada et al. | 523/160 |
| 2006/0096498 | A1 | 5/2006 | Tsujimura et al. | 106/31.27 |
| 2006/0098067 | A1 | 5/2006 | Imai et al. | 347/100 |
| 2006/0098068 | A1 * | 5/2006 | Hakamada et al. | 347/100 |
| 2006/0100311 | A1 | 5/2006 | Tokuda et al. | 523/160 |
| 2006/0103703 | A1 | 5/2006 | Nito et al. | 347/100 |
| 2006/0125895 | A1 | 6/2006 | Nito et al. | 347/100 |
| 2006/0125896 | A1 | 6/2006 | Aikawa et al. | 347/100 |
| 2006/0135647 | A1 | 6/2006 | Ichinose et al. | 523/160 |
| 2006/0137570 | A1 | 6/2006 | Osumi et al. | 106/31.27 |
| 2006/0139428 | A1 | 6/2006 | Osumi et al. | 347/100 |
| 2006/0139429 | A1 | 6/2006 | Osumi et al. | 347/100 |
| 2006/0142417 | A1 | 6/2006 | Kaneko et al. | 523/160 |
| 2006/0152570 | A1 | 7/2006 | Ishikawa et al. | 347/105 |
| 2006/0192827 | A1 | 8/2006 | Takada et al. | 347/100 |
| 2006/0194056 | A1 | 8/2006 | Nagashima et al. | 428/403 |
| 2006/0194897 | A1 | 8/2006 | Kawabe et al. | 523/160 |
| 2006/0196389 | A1 | 9/2006 | Tsuji et al. | 106/31.43 |

FOREIGN PATENT DOCUMENTS

| | | |
|---|---|---|
| JP | 2000-63719 | 2/2000 |
| JP | 2000-198955 | 7/2000 |
| JP | 2000-238405 | 9/2000 |
| JP | 2002-3768 | 1/2002 |
| JP | 2002-166578 | 6/2002 |
| JP | 2002-332436 | 11/2002 |
| JP | 2002-332440 | 11/2002 |
| JP | 2003-96371 | 4/2003 |
| JP | 2003-277653 | 10/2003 |
| JP | 2004-27127 | 1/2004 |
| JP | 2004-115590 | 4/2004 |
| JP | 2004-249612 | 9/2004 |
| WO | WO 01/51566 A1 | 7/2001 |
| WO | WO 2004/029164 | 4/2004 |
| WO | WO 2004/061023 A1 | 7/2004 |

* cited by examiner

FIG. 13A1
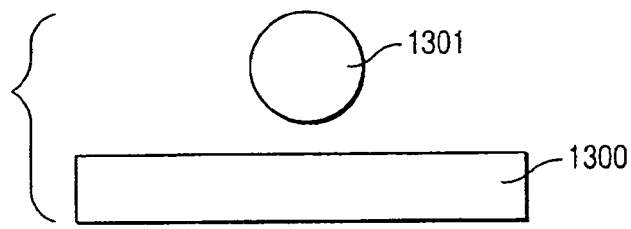
FIG. 13A2
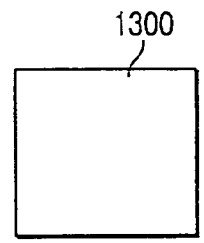
FIG. 13B1
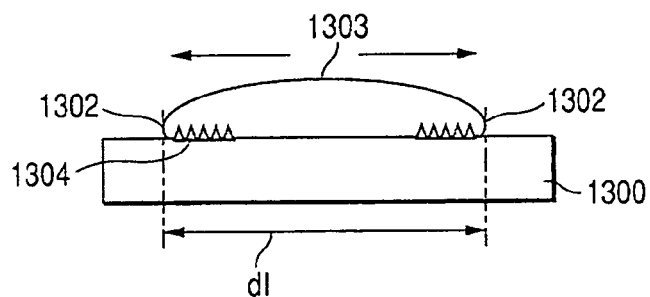
FIG. 13B2
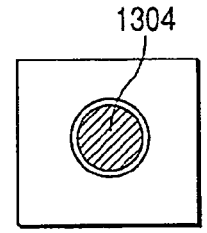
FIG. 13C1
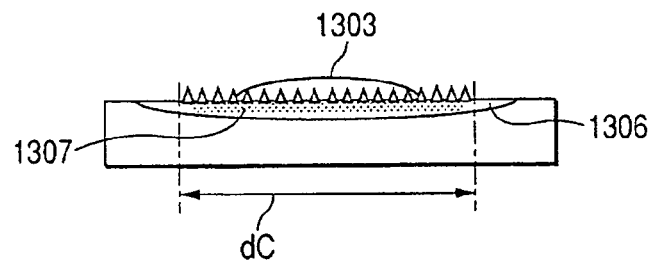
FIG. 13C2
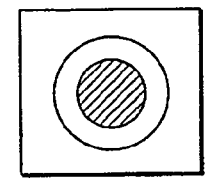
FIG. 13D1
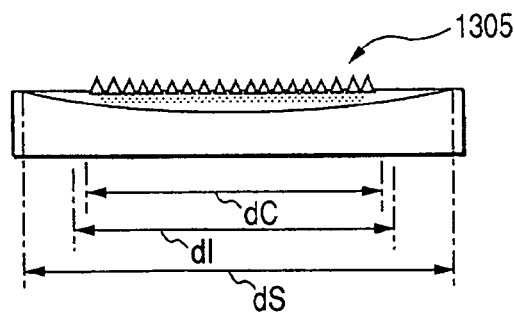
FIG. 13D2
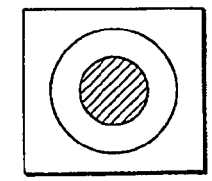

RECORDING METHOD, INK CARTRIDGE, AND IMAGE-FORMING METHOD

This application is a continuation of International Application No. PCT/JP2005/012289, filed Jun. 28, 2005, which claims the benefit of Japanese Patent Application No. 2004-190546, filed Jun. 28, 2004.

BACKGROUND OF THE INVENTION

1. Field of the Invention

The present invention relates to a recording method using an aqueous ink comprising a water-insoluble coloring material, an ink cartridge therefore; and an image-forming method employing the ink.

2. Related Background Art

Inks containing a water-insoluble coloring material like a pigment as a coloring material (pigment inks) are known to give images having high fastness such as water resistance and lightfastness. Lately, various techniques have been disclosed for improving the density of the images formed by use of such inks.

For example, use of an ink which contains self-dispersion carbon black and a specific salt is disclosed for improvement of the image density (e.g., Japanese Patent Application Laid-Open No. 2000-198955). In another disclosure, an image of a high quality is formed by depositing an ink-jet recording ink composition containing a pigment, a fine particulate polymer, a water-soluble organic solvent, and water, and an aqueous polyvalent metal salt solution on a recording medium to induce reaction between the ink composition and the aqueous polyvalent metal salt solution (e.g., Japanese Patent Application Laid-Open No. 2000-63719). Such techniques enable formation of images of a high density by forcing the pigment dispersed in the ink to flocculate on the surface of the recording medium to retard permeation of the pigment into the recording medium.

SUMMARY OF THE INVENTION

The aforementioned techniques, which utilize flocculation of pigment particles on a recording medium, cause insufficiency of the area of coloring material coverage of the recording medium for a volume of the ink droplets (referred to as an area factor). For example, the ink of the above technique should be applied in a larger amount for obtaining the same image density as that of conventional pigment inks containing a pigment dispersed by polymeric dispersant.

By some methods, a large area factor can be obtained with a small volume of ink droplets by increasing the permeability of the ink into the recording medium. However, the higher permeability of the ink increases permeation of the ink not only on the surface of a recording medium but also from the surface in a thickness direction into a recording medium, which can lower the concentration of the coloring material at or near the surface of the recording medium, resulting in a lower image density.

It has also been found that the higher coloring material concentration in the ink tends to cause retention of an excessive amount of the coloring material on the surface of the recording medium, formation of visually irregular ink dots, or existence of a useless coloring material portion not contributing to the color development.

The inventors of the present invention investigated image formation by using a variety of aqueous inks on a plain paper. Thereby, another problem was found that even though a smaller amount of the ink can give a sufficient area factor in a portion of a higher image density, image graininess can become remarkable in a portion of a lower image density like a highlight portion, depending on the composition of the aqueous ink or the kind of the recording medium.

Accordingly, the present invention intends to provide a recording method which can achieve a sufficiently large area-factor with a smaller amount of ink droplets in a higher image density portion and which can decrease image graininess in a lower image density portion like a highlight portion.

The present invention intends also to provide an image forming method by employing the above recording method comprising steps of applying an aqueous ink comprising a water-insoluble coloring material to a recording medium, and applying a reaction liquid for destabilizing a dispersion state of the water-insoluble coloring material in the aqueous ink (hereinafter the method being occasionally referred to as a "two-liquid system"), whereby the ink can achieve a sufficiently large area-factor with a smaller amount of the ink droplets to form an image at a high image density, and can decrease image graininess in comparison with conventional two-liquid systems.

The present invention further intends to provide an ink cartridge suitably used in the above recording method.

The present invention still further intends to provide an image-forming method which can prevent effectively color mixing (bleeding) at the boundary between adjacent different color regions when a color image is recorded with different color regions on a plain paper.

The above objects can be achieved by the present invention described below.

According to an aspect of the present invention, there is provided a recording method using a first aqueous ink for higher-density recording and a second aqueous ink for lower-density recording, characterized in that the first aqueous ink comprises at least water, a water-insoluble coloring material, and plurality of water-soluble organic solvents, in which the plurality of water-soluble organic solvents including a good medium or good mediums for the water-insoluble coloring material and a poor medium or poor mediums for the water-insoluble coloring material, the ratio B/A in the second aqueous ink being less than the ratio B/A in the first aqueous ink, where A denotes the total content (mass %) of good medium based on the total mass of the aqueous ink and B denotes the total content (mass %) of poor medium based on the total mass of the aqueous ink; and the second aqueous ink has the same hue as the first aqueous ink.

According to another aspect of the present invention, there is provided a recording method comprising (i) a step of applying an aqueous ink comprising a water-insoluble coloring material to a recording medium, and (ii) a step of applying a reaction liquid capable of making the state of dispersion of the water-insoluble coloring material in the aqueous ink unstable on contact with the aqueous ink to a recording medium, characterized in that higher-density recording is conducted by using a first aqueous ink and lower-density recording is conducted by using a second aqueous ink, the first aqueous ink comprising at least water, a water-insoluble coloring material, a good medium or good mediums for the water-insoluble coloring material and a poor medium or poor mediums for the water-insoluble coloring material, the ratio B/A in the second aqueous ink being less than the ratio B/A in the first aqueous ink, where A denotes the total content (mass %) of good medium based on the total mass of the aqueous ink and B denotes the total content (mass %) of poor medium based on the total mass of the aqueous ink; and the second aqueous ink has the same hue as the first aqueous ink.

According to still another aspect of the present invention, there is provided an embodiment of a recording method using a first aqueous ink for higher-density recording and a second aqueous ink for lower-density recording, characterized in that the first aqueous ink comprises at least water, a water-insoluble coloring material, and plurality of water-soluble organic solvents, the plurality of water-soluble organic solvents including a good medium or good mediums for the water-insoluble coloring material and a poor medium or poor mediums for the water-insoluble coloring material, and the ratio B/A in the second aqueous ink being less than the ratio B/A in the first aqueous ink, where A denotes the total content (mass %) of good medium based on the total mass of the aqueous ink and B denotes the total content (mass %) of poor medium based on the total mass of the aqueous ink, the second aqueous ink has the same hue as the first aqueous ink, and a water-soluble organic solvent which shows the maximum Ka value among the respective Ka values of the plurality of water-soluble organic solvents as determined by Bristow method is the poor medium, and the poor medium or the poor mediums permeates into the recording medium ahead of the good medium or the good mediums and the poor medium or poor mediums to promote flocculation of the water-insoluble coloring material in the good medium or the good mediums at the surface side of the recording medium.

According to a further aspect of the present invention, there is provided an embodiment of an ink cartridge comprising an ink holding member containing an ink therein, characterized in that the ink is the above first or second aqueous ink.

According to a further aspect of the present invention, there is provided an embodiment of an image-forming method for forming an image by use of a black ink and at least one color ink by an ink-jet recording method on a recording medium, characterized in that the black ink is an aqueous ink having the above constitution; and, in forming an image composed of an image formed with the black ink and an image formed with the color ink are adjacent to each other, performing scanning for applying the black ink to form the image and thereafter performing scanning for applying the color ink to the area where the image has been formed by the precedent scanning.

[Effect of the Invention]

According to the present invention, a recording method is provided which can achieve a sufficiently large area factor with a smaller amount of ink droplets in a higher image density portion and which can decrease image graininess in a lower image density portion like a highlight portion. According to another embodiment, the present invention provides an image forming method by employing the above recording method, comprising steps of applying an aqueous ink comprising a water-insoluble coloring material onto a recording medium, and applying a reaction liquid for destabilizing a dispersion state of the water-insoluble coloring material in the aqueous ink, whereby the ink can achieve a sufficiently large area factor with a smaller amount of the ink droplets to form an image at a high image density, and can decrease image graininess in comparison with conventional two-liquid systems. According to still another embodiment, an ink cartridge is provided which can be suitably used in the above recording method.

BRIEF DESCRIPTION OF THE DRAWINGS

FIGS. 13A1, 13A2, 13B1, 13B2, 13C1, 13C2, 13D1, and 13D2 illustrate schematically states of landing of ink droplets on the surface of a recording medium.

DETAILED DESCRIPTION OF THE PREFERRED EMBODIMENTS

Figure 1:
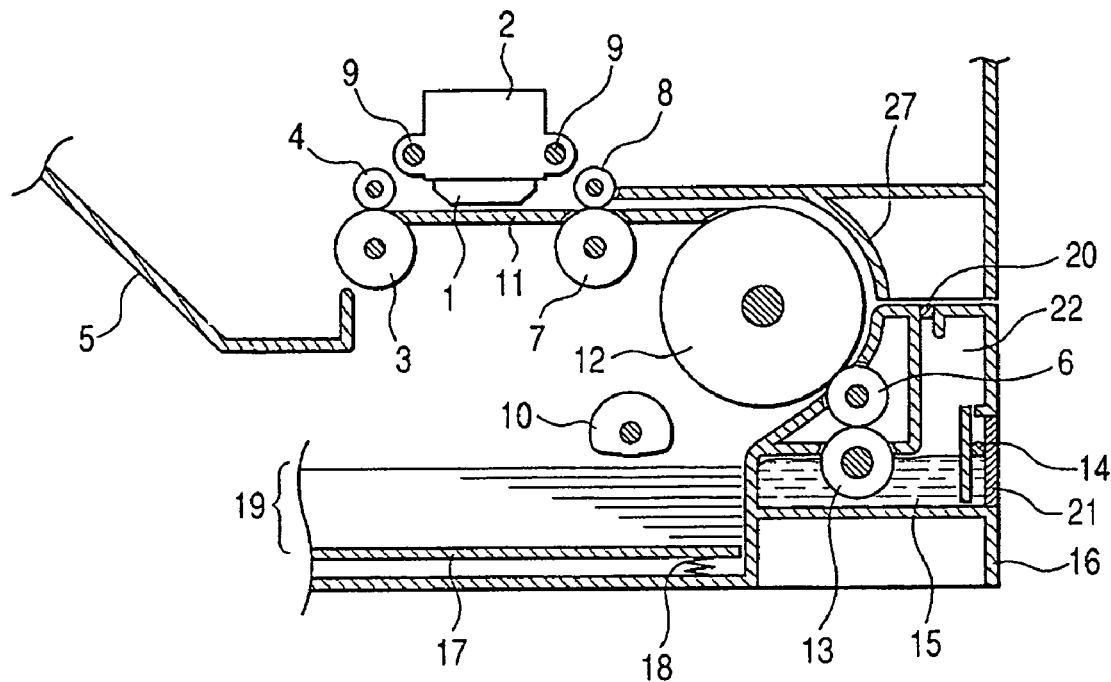
FIG. 1 is a schematic sectional side view of an example of an ink-jet recording apparatus.

The present invention is explained below in more detail by reference to embodiments.

Firstly, a poor medium and a good medium in the present invention are explained. The definition thereof is shown specifically later. Of water-soluble organic solvents, a solvent which is capable of dispersing a water-insoluble coloring material stably therein is called a good medium, and a solvent which is not capable of dispersing a water-insoluble coloring material stably is called a poor medium in the present invention.

A first aqueous ink of the present invention is characterized by the water-soluble organic solvents to be comprised therein together with the water-insoluble coloring material. Where the water-insoluble coloring material is used as a coloring material, a water-soluble organic solvent good in dispersion stability of the pigment comprised therein and a water-soluble organic poor in dispersion stability of the water-insoluble coloring material comprised therein are defined as a good medium and a poor medium, respectively. The first aqueous ink is constituted of a good medium and a poor medium for the water-insoluble coloring material in a specified ratio of the poor medium and the good medium. Such constitution of the aqueous ink enables formation of an image with effective prevention of ink-bleeding even on a plain paper which usually involves difficulties in image formation with an aqueous ink, and formation of an image with a high image density with less quantity of the applied ink droplets at a sufficiently large area factor. A two-liquid system employing the first aqueous ink of the above constitution can give an image of high quality in comparison with conventional ink composition.

When the first aqueous ink having the above constitution is applied to a two-liquid system, attention must be paid to the need that the ink should be applied to a recording medium after the completion of the fixation of a reaction liquid to the recording medium. The reason for this is as follows. When the reaction liquid and the ink in liquid states are in contact with each other on the recording medium as in a conventional two-liquid system, an area by which the surface of the recording medium can be covered with a coloring material as compared to the volume of an ink droplet (referred to as an area factor) may not be sufficient, or fixability may reduce to some degree depending on the reactivity between the ink and the reaction liquid.

However, when an image is formed by single use of the ink comprising the poor medium and the good medium at the ratio in the specified range, image graininess can sometimes become conspicuous depending on the kind of the recording medium at a lower image density portion like a highlight portion because the flocculation of the water-insoluble coloring material proceeds quickly during dot spreading after application of the ink onto the recording medium.

Presumably, this can be caused by the phenomenon below. The detailed mechanism will be described later. An ink having the aforementioned characteristics, when applied singly on a recording medium, the ink dots will diffuse by keeping a nearly perfect circle shape on and near the surface of the recording medium. In the process of the diffusion, the concentration of the poor medium increases rapidly, which destabilize the dispersion state of a water-insoluble coloring material to cause flocculation or dispersion destruction of the water-insoluble coloring material. The flocculation of the water-insoluble coloring material results in increase of the area factor to increase the image density.

In other words, adjustment of the ratio of the poor medium and the good medium in the ink in a specified range enables a larger area factor, and a higher image density than that achieved by conventional inks. However, single use of the above ink can cause conspicuous graininess at a highlight portion on some of recording mediums. In particular, when an ink having the above characteristics is used in a two-liquid system, the image graininess is more conspicuous in a lower image density portion like a highlight portion.

To solve the above problem, the inventors of the present invention have made comprehensive investigation, and have found the matters below. Use of two types of inks is effective a first aqueous ink for higher-density recording, and a second aqueous in for lower-density recording. The ratios of the good medium and the poor medium in the inks are adjusted to be in respective specified ranges. Thereby, the ink running rate after application of the ink onto the recording medium is controlled to obtain sufficiently large area factor and to form a high density image with less amount of ink in a higher image density portion, and to decrease graininess in a lower image density portion like a highlight portion. Thereby, the present invention has been accomplished.

The first aqueous ink, the second aqueous ink; and relation between the good medium and the poor medium for the water-insoluble coloring material are explained below:

[First Aqueous Ink]

The preferred embodiment of the first aqueous ink of the present invention comprises at least water, a water-insoluble coloring material, and a plurality of water-soluble organic solvents. The plurality of water-soluble solvents include a good medium or good mediums and a poor medium or poor mediums: and the ratio B/A in the second aqueous ink is less than the ratio B/A in the first aqueous ink, where the total content of the good medium based on the total mass of the aqueous ink is denoted by A (mass %), and the total content of the poor medium based on the total mass of the aqueous ink is denoted by B (mass %). The first aqueous ink composition comprises water, a water-insoluble coloring material, and plurality of water-soluble solvents including a good and poor medium for the water-insoluble coloring material at a specified ratio to keep dispersion stability of the water-insoluble coloring material.

The first aqueous ink of the present invention has a similar constitution as conventional aqueous inks comprising a water-insoluble coloring material except for the above-mentioned specific constitution of the water-soluble organic solvent.

In another preferred embodiment of the present invention, printing is conducted with an aqueous ink of the above constitution on a recording medium on which a reaction liquid has been applied. In this printing, bleeding is effectively prevented in comparison with conventional two-liquid systems, and further, image qualities can be improved without strike-through with high image density and high-speed fixation.

<Image Formation Mechanism with First Aqueous Ink>

The mechanism of image formation with the first aqueous ink of the present invention is explained below by reference to an example. The first aqueous ink of the present invention, when used for printing on a recording medium, especially on a plain paper, can give an excellent image density and printing quality presumably by the reason below. As shown in FIGS. 13A1-13D2, immediately after landing of the ink droplet of the present invention on the recording medium such as a plain paper, the ratio of the water, the good medium and poor medium for a water-insoluble coloring material, and the water-insoluble coloring material will change continuously. Presumably, after landing of ink droplet 1301 shown in FIG. 13A1 on the surface of recording medium 1300 shown in FIG. 13A2, with progress of fixation of the ink on the recording medium and vaporization of water, poor medium 1307 having a higher Ka value in the water-soluble organic solvent in the ink diffuses in a shape of nearly perfect circle on or near the surface of the recording medium more rapidly than the good medium having a lower Ka value to form an ink dot.

Figure 2:
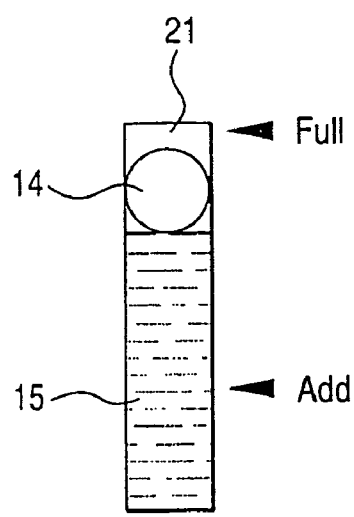
FIG. 2 is a sectional front view of a reaction liquid level indicator attached to the ink-jet recording apparatus shown in FIG. 1.

FIGS. 13B1-13D2 show schematically the states of ink 1301 in the process after landing on recording medium 1300 to ink fixation. Noting the spreading of ink dot in this process, the concentration of the poor medium is considered to be higher at dot periphery 1302 in the ink-paper contact portion than at center portion 1303 of the dot. Consequently, the ink dot spreads in a nearly perfect circle shape on or near the recording medium surface. Thereby the concentration of poor medium 1307 increases rapidly relative to water-insoluble coloring material 1304. This destabilizes rapidly the dispersion of water-insoluble coloring material 1304 to cause flocculation of the dispersed water-insoluble coloring material or dispersion destruction. The diffusion process forming a rim nearly perfectly circular on the recording medium (FIGS. 13B1 and 13B2), keeping water-insoluble coloring material 1304 on the surface of recording medium 1300, as if a bank is formed by water-insoluble coloring material 1304 along periphery of the dot. In such a manner, a dot of water-insoluble coloring material 1304 can be formed in a perfect circle shape and can be fixed in that state on the recording medium. The formation of the dot of water-insoluble coloring material 1304 is completed in this moment, whereas portion 1306 of water-soluble organic solvent and water diffuses further radially (FIGS. 13C1 and 13C2). Thus, after completion of the dot formation of the water-insoluble coloring material, portion 1306 of water-soluble organic solvents and water diffuses on or near the surface of the recording medium. During the diffusion, in good medium-rich center portion 1303, the water-soluble organic solvent evaporates or permeates to deposit the water-insoluble coloring material to form dot 1305 (FIGS. 13D1-13D2). The image formed by the above method has a sufficient area factor even with a less amount of the ink droplets, having a high image density and high quality.

[Second Aqueous Ink]

The preferred embodiment of the second aqueous ink of the present invention is characterized in that the ink comprises at least water, a water-insoluble coloring material, and a water-soluble organic solvent, that the water-soluble organic solvent is a good medium or good mediums for the water-insoluble coloring material, that the ratio B/A in the second aqueous ink is less than the ratio B/A in the first aqueous ink where A denotes the total content (mass %) of the good medium based on the total mass of the aqueous ink and B denotes the total content (mass %) of the poor medium based on the total mass of the aqueous ink, and that the second aqueous ink has the same hue as the first aqueous ink.

The second aqueous ink of the present invention has a similar constitution as conventional aqueous inks comprising a water-insoluble coloring material except for the above-mentioned specific constitution of the water-soluble organic solvent.

The second aqueous ink of the present invention has essentially the same hue as the first aqueous ink. The term "the same hue" in the present invention signifies, for example, the hue of a cyan ink and a photo cyan ink; a magenta ink and a photo magenta ink; a black ink and a gray ink; and so forth, but is not limited thereto. The first aqueous ink and the second aqueous ink may contain the coloring material substantially at the same concentration.

In another preferred embodiment of the present invention, printing is conducted with aqueous inks of the above constitutions on a recording medium where a reaction liquid has been preliminarily applied. In this printing, blurring is promoted by use of the second aqueous ink to decrease a graininess sensation effectively in comparison with a conventional two-liquid system.

<Image Formation Mechanism with Second Aqueous Ink>

Figure 14A:
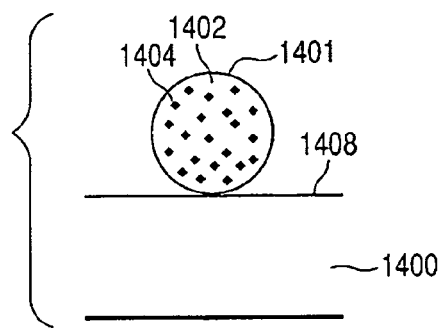
FIGS. 14AA, 14AB, 14AC, 14AD, 14BA, 14BB, 14BC, and 14BD illustrate schematically states of landing of ink droplets on the surface of a recording medium.
Figure 14A:
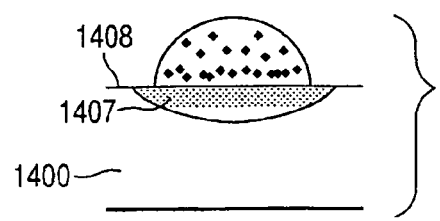
Figure 14A:
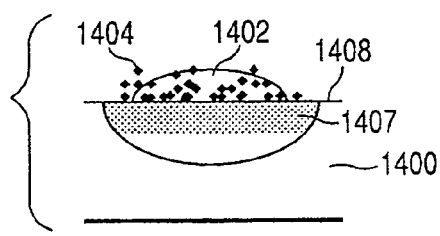
Figure 14A:
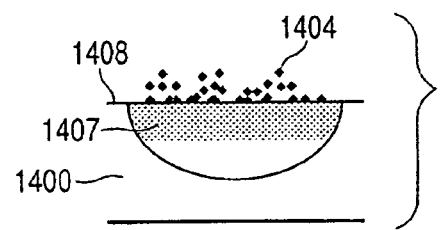

The mechanism of image formation with the second aqueous ink is explained by reference to FIGS. 14 AA-14BD and FIGS 15AB-15BD. FIGS. 14AA-14AD show schematically the process of fixation of the first aqueous ink after deposition on a recording medium. This process is similar to the one explained above by reference to FIGS. 13A1-13D2. In this process, the ink droplet having been deposited on a recording medium diffuses, and the dispersion of the water-insoluble coloring material is made instable to cause flocculation or dispersion destruction of the water-insoluble coloring material. This allows the water-insoluble coloring material to stay on the surface of the recording medium just like formation of an embankment with the water-insoluble coloring material on a peripheral portion of the dot. Through such a process, the dot of the water-insoluble coloring material is formed in a nearly perfect circle shape and is fixed in that state on the recording medium surface.

Figure 14B:
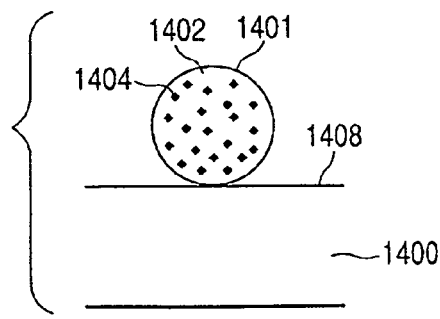
Figure 14B:
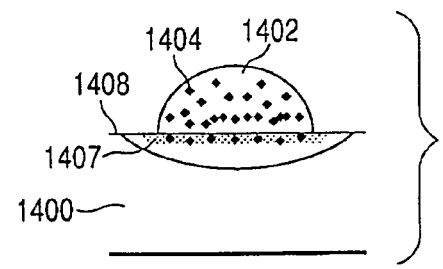
Figure 14B:
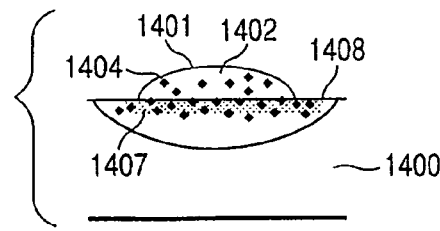
Figure 14B:
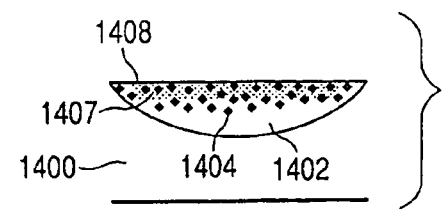
Figure 15A:
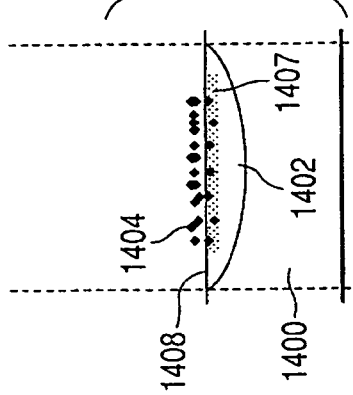
FIGS. 15AB, 15AD, 15BB, and 15BD illustrate schematically states of landing of ink droplets on the surface of a recording medium.
Figure 15B:
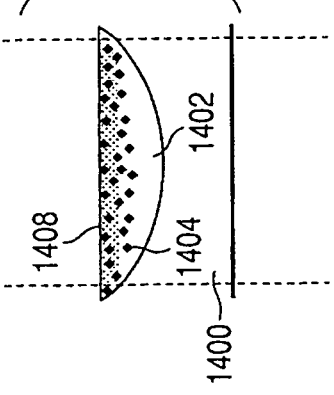
Figure 15A:
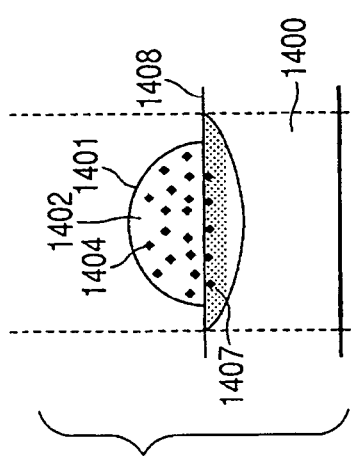
Figure 15B:
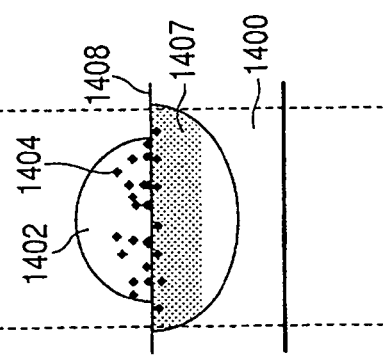

FIGS. 14BA-14BD show schematically the process of fixation of the second aqueous ink after deposition on a recording medium. In the second aqueous ink, the ratio of the total content of the poor medium (mass %) to the total content of the good medium (mass %) is less than that in the first aqueous ink. Therefore, in the process of ink dot diffusion, the degree of flocculation or dispersion destruction of the second aqueous ink after deposition on the recording medium is less than that of the first aqueous ink. Accordingly, the water-insoluble coloring material spreads radially with diffusion of the water-soluble organic solvent and water. As the result, the second aqueous ink spreads at a higher spreading rate than the first aqueous ink on the recording medium as shown in FIGS. 15AB and 15BB and FIGS. 15AD and 15BD.

From the above results, use of the second aqueous ink for image formation can reduce the image graininess in the portions of a lower image density like a highlight portion.

[How to Distinguish Good Medium and Poor Medium]

According to the above assumed mechanism, the good medium and the poor medium in the present invention is discriminated by whether or not the dispersion state of the water-insoluble coloring material can suitably be maintained, namely by the relation thereof with the water-insoluble coloring material or a dispersant therefore. Thus, in preparation of the inks of the present invention, the good medium and the poor medium are selected preferably by observation of dispersion stability of the water-insoluble coloring material to be used. The inventors of the present invention investigated the standard for judgment of the good medium and the poor medium for achieving the effect of the present invention. Thereby the inventors found the method for judgment below to be effective.

Firstly, a dispersion solution of the water-insoluble coloring material is prepared which contains 50 mass % of each water-soluble organic solvent to be judged and 45 mass % of water and also contains 5 mass % of the water-insoluble coloring material to be used in the ink. The dispersion solution thus prepared is stored at 60° C. for 48 hours. The water-soluble organic solvent is regarded as a poor medium when the average particle size of the water-insoluble coloring material in the tested liquid has become larger than the average particle size of the water-insoluble coloring material in the water dispersion solution containing 5 mass % of the water-insoluble coloring material and 95 mass % of water. The water-soluble organic solvent is regarded as a good medium when the average particle size thereof is equal to or smaller in comparison with that in the above comparative dispersion solution.

More specifically, the water-soluble organic solvent is judged to be a good medium or a poor medium for a water-insoluble coloring material by the procedure described below. Firstly, two kinds of dispersion solutions are prepared: dispersion solution A of a water-insoluble coloring material in a solvent containing the water-soluble organic solvent to be tested, and water dispersion solution B of the same water-insoluble coloring material in water.

Dispersion Solution A: a water-insoluble coloring material dispersion solution containing 50 mass % of the water-soluble organic solvent to be tested, 5 mass % of the water-insoluble coloring material (or 5 mass % in total of a water-insoluble coloring material and a substance contributing to the dispersion of the coloring material), and 45 mass % of water;

Water dispersion solution B: a water-insoluble coloring material dispersion solution containing 5 mass % of the water-insoluble coloring material (or 5 mass % in total of the water-insoluble coloring material and a substance contributing to the dispersion of the coloring material), and 95 mass % of water.

The dispersion solution A is kept at 60° C. for 48 hours, and cooled to ordinary temperature. The average particle size of the water-insoluble coloring material in the dispersion solution A is measured by a fiber-optics particle analyzer (trade name: FPAR-1000; Otsuka Denshi K.K.). On the other hand, the average particle size of the water-insoluble coloring material in the water dispersion solution B not stored with heating is measured in the same manner as above by the fiber-optics particle analyzer. Here, the average particle sizes of the water-insoluble coloring material in the dispersion solution A and the water dispersion solution B are respectively denoted by particle size (A) and particle size (B). The good medium and the poor medium are judged according to the standard below:

Poor medium: When the particle size (A) is larger than the particle size (B), the tested water-soluble organic solvent is defined to be a poor medium.

Good medium: When the particle size (A) is the same as or smaller than the particle size (B), the tested water-soluble organic solvent is defined to be a good medium.

The aforementioned excellent effect is confirmed with an ink having the constitution of the present invention prepared by use of the good and poor mediums as discriminated in the above manner.

[Ka Value of Water-Soluble Organic Solvent]

In the present invention, different kinds of water-soluble organic solvents to be contained in the first aqueous ink are compared. As the result, the water-soluble organic solvent having the largest Ka value is preferably the poor medium for effective image formation by the aforementioned mechanism.

The Ka value determined by a Bristow method is explained below. The Ka value is used as a measure of permeability of a liquid into a recording medium. In the explanation below, an ink is taken as the example of the liquid. The quantity V of the ink penetrating per 1 m² is shown by the Bristow's equation (Equation (1)).

$$V = V_r + Ka(t-t_w)^{1/2} \qquad (1)$$

where t denotes lapse of the time after ejection of the ink droplet, V denotes a permeation quantity (mL/m²=μm) of the ink into the recording medium.

Immediately after application of the ink onto the recording medium, most portion of the applied ink is absorbed by the roughness portion of the surface of the recording medium (surface roughness portion of the recording medium) without permeation into the interior of the recording medium (in the depth direction). The time before the start of the permeation is the contact time ($t_w$). The volume of the ink retained by the roughness portion of the recording medium during the contact time is represented by $V_r$. After the lapse of the contact time after the ink application on the recording medium, the ink permeates in a quantity proportional to ½-power of the time after the contact time, namely $(t-t_w)^{1/2}$, into the interior of the recording medium (in the depth direction) to increase the permeation quantity. The value Ka is a proportion coefficient of the increase, corresponding to the permeation rate. Incidentally, the Ka value can be determined by means of a dynamic permeability tester for Bristow method (e.g., trade name Dynamic Permeability Tester S, Toyo Seiki Seisakusho K.K.).

The value Ka for the Bristow method in the present invention is measured with a plain paper as the recording medium, e.g., PB paper sheets (Canon K.K.) for electrophotographic copying machines, page printers (laser beam printers), and ink-jet printers; and PPC paper sheets for electrophotographic copying machines). The measurement environment is decided in consideration of usual office environments; for example, temperature of 20-25° C., and humidity of 40-60%.

[Relation between First Aqueous Ink and Second Aqueous Ink]

As described above, by defining the ratios of the poor medium and the good medium to the water-insoluble coloring material contained in the first aqueous ink and the second aqueous ink as mentioned above, a sufficiently large area factor can be achieved with a smaller amount of ink droplets in a higher image density portion, and image graininess can be decreased in a lower image density portion like a highlight portion.

As the results of further investigation by the inventors of the present invention, superior gradation of the image can be obtained as another effect as the ratios of the poor medium content and the good medium content in the first aqueous ink and the second aqueous ink are closer to each other. Specifically, when the total content of good medium based on the total mass of each aqueous ink is denoted by A (mass %) and the total content of the poor medium based on the total mass of each aqueous ink is denoted by B (mass %). based on the total mass of each aqueous ink, the difference between ratio B/A in the first aqueous solvent and ratio B/A in the second aqueous solvent is preferably 1 or less, more preferably 0.5 or less.

[Aqueous Ink]

The main feature of the present invention is, as mentioned above, use of a first aqueous ink and a second aqueous ink in which inks the quantity ratio relation of the good medium and the poor medium for the water-insoluble coloring material in the aqueous ink is made different to cause difference in ink running properties, and the two aqueous inks are selectively used for intended image density.

The first aqueous ink and the second aqueous ink should contain the water-soluble organic solvents in the constitution as mentioned above for the water-insoluble coloring material, but in other points, the inks may have similar constitution as conventional aqueous inks. The components of the aqueous ink of the present invention are explained below.

<Aqueous Medium>

The aqueous medium constituting the aqueous ink of the present invention is explained below. The aqueous medium is a mixed medium composed of water and a water-soluble organic solvent. In the present invention, the water-soluble organic solvents are classified into good mediums and poor mediums for the pigment. According to the classification, in the preparation of the ink, the water-soluble organic solvents are selected: at least a good medium and a poor medium should be incorporated mixedly in the ink in the content ranges defined in the present invention. The contents of the water-soluble organic solvents in the ink are adjusted as follows. For the total content A (mass %) of the good medium and the total content B (mass %) of the poor medium, based on the total mass of each aqueous ink, the ratio B/A in the second aqueous ink is less than the ratio B/A in the first aqueous ink.

The water-soluble organic solvents include specifically alkyl alcohols of 1-4 carbons such as methyl alcohol, ethyl alcohol, n-propyl alcohol, isopropyl alcohol, n-butyl alcohol; s-butyl alcohol, and t-butyl alcohol; amides such as dimethylformamide, and dimethylacetamide; ketones or ketoalcohols such as acetone, and diacetone alcohol; ethers such as tetrahydrofuran, and dioxane; polyalkylene glycols such as polyethylene glycol, and polypropylene glycol; alkylene glycols having an alkylene group of 2-6 carbons such as ethylene glycol, propylene glycol, butylene glycol, triethylene glycol, 1,2,6-hexane triol, thiodiglycol, hexyleneglycol, and diethylene glycol; lower alkyl ether acetates of polyhydric alcohols such as polyethylene glycol monomethyl ether acetate; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; N-methyl-2-pyrrolidone; 2-pyrrolidone; and 1,3-dimethyl-2-imidazolidinone. The water is preferably deionized water.

The contents of the water-soluble organic solvents in the aqueous inks are not specially limited, but preferably range from 3 mass % to 50 mass % based on the total mass of the ink. In particular, for achieving effectively the effect of the present invention, in the first aqueous ink, the total content (mass %) of the poor medium is preferably 4 mass % or more based on the total mass of the ink, or total content of the poor medium is equal to or more than the solid content (mass %) of the water-insoluble coloring material based on the total mass of the ink. The contents of water in the aqueous inks range preferably from 50 mass % to 95 mass % based on the total mass of the ink.

In a preferred embodiment of the present invention, in constituting the first aqueous ink, the kinds and contents of the water-soluble organic solvents are adjusted to obtain the ratio $A_1:B_1$ (where $A_1$ denotes the total content (mass %) of the good medium based on the total mass of the first aqueous ink and $B_1$ denotes the total content $B_1$ (mass %) of the poor medium based on the total mass of the first aqueous ink), namely the ratio $A_1:B_1$ [the ratio of the total content of the good medium:the total content of the poor medium in the first aqueous ink] ranges from 10:5 or more to 10:30 or less, preferably from 10:5 or more to 10:10 or less, more preferably from 10:6 or more to 10:10 or less. The statement "the ratio $A_1:B_1$ ranges from 10:5 or more to 10:30 or less" means that the $B_1$ is 5 or more to 30 or less for $A_1$ of 10.

In another prefeffed embodiment of the present invention, in constituting the second aqueous ink, the kinds and contents of the water-soluble organic solvents are adjusted to obtain the ratio $A_2:B_2$ (where $A_2$ denotes the total content (mass %) of the good medium and $B_2$ denotes the total content (mass %) of the poor medium), namely the ratio $A_2 B_2$ [the ratio of the total content of the good medium:the total content of the poor medium in the second aqueous ink] to be preferably less than $A_2:B_2=5:10$. Within the above range, ink dot running degree is increased, and graininess is effectively reduced. The second aqueous ink should comprise essentially the good medium, but the poor medium need not be contained.

According to comprehensive investigation made by the inventors of the present invention, a higher content of the good medium in the aqueous ink improves the storage stability of the aqueous ink, but retards formation of a high-density image on a plain paper as the recording medium. On the other hand, a lower content of the good medium in the aqueous ink gives a high-density image, but may lower the storage stability of the aqueous ink.

However, control of the ratio of the good medium and the poor medium in the water-soluble organic solvents in the ink in the above range enables simultaneously high storage stability of the aqueous ink and high-density image formation. Further, with the second aqueous ink applied to a lower image density portion like a highlight portion, a lower content of the poor medium enables decrease of graininess of the image. Furthermore, with the first aqueous ink, control of Ka value of the Bristow method, an index for permeation into the recording medium, by selecting the water-soluble organic solvents enables formation of a high-density image with a sufficient area factor with a smaller amount of the ink droplets, which cannot be achieved by conventional inks.

<Water-Insoluble Coloring Material>

The water-insoluble coloring material for constituting the aqueous inks of the present invention is explained below. The water-insoluble coloring material constituting the aqueous ink of the present invention may be of any dispersion type. Of the coloring material, pigments are particularly preferred. The pigments include specifically resin dispersion type pigments employing a dispersant or a surfactant, surfactant dispersion type pigments, microcapsule type pigments constituted of a pigment having increased self-dispersibility without employing a dispersant, self-dispersion type pigments having a hydrophilic group on the pigment particle surface, polymer-bonded self-dispersion type pigments having an organic group containing a polymer bonded to the pigment particle surface, and so forth. Naturally, different dispersion types of the pigment may be used in combination.

The water-insoluble coloring material of the present invention may be any of the above-mentioned resin dispersion type pigments, self-dispersion type pigments, and polymer-bonded self-dispersion type pigments, and is used in dispersion in an aqueous medium. Therefore, the good medium and the poor medium for the water-insoluble coloring material in the present invention serves naturally as a good medium or a poor medium for the resin dispersion type pigments, self-dispersion type pigments, or polymer-bonded self-dispersion type pigments. The water-insoluble coloring materials are explained below which are useful in the present invention.

The water-insoluble coloring material in the present invention is contained at the content (mass %) ranging preferably from 1 mass % to 10 mass % based on the total mass of the ink. The content (mass %) of the water-insoluble coloring material in the first aqueous ink may be the same as or different from the content (mass %) of water-insoluble coloring material in the second aqueous ink.

(Pigment)

The pigment used in the aqueous ink of the present invention is not specially limited, including those mentioned below. One aqueous ink may contain plural kinds of pigments combinedly, as necessary.

For constituting the black inks, carbon black is suitably used as the pigment. For example, any type of carbon black such as furnace black, lamp black, acetylene-black, and channel black is useful. Specifically, useful commercial carbon black include Ravan 7000, Ravan 5750, Ravan 5250, Ravan 5000 ULTRA, Ravan 3500, Ravan 2000, Ravan 1500, Ravan 1250, Ravan 1200, Ravan 1190 ULTRA-11, Ravan 1170, and Ravan 1255 (Columbia); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Monarch 2000, Valcan XC-72R (Cabot); Color Black FW1, Color Black FW2, Color Black FW2V, Color Black FW18, Color Black FW200, Color Black S150, Color Black S160, Color Black S170, Printex 35, Printex U, Printex V, Printex 140U , Printex 140V. Special Black 6, Special Black 5, Special Black 4A, Special Black 4 (Degussa); No. 25, No. 33, No. 40, No. 47, No. 52, No. 900, No. 2300, MCF-88, MA600, MA7, MA8, MA100 (Mitsubishi Chemical Corp.). Otherwise, carbon black may be newly prepared for use in the present invention. However, the carbon black is not limited thereto, and any conventional carbon black may be used. The pigment for the black ink is not limited to carbon black. Magnetic fine particles such as magnetite and ferrite; titanium black, and the like may used as the black pigment.

For inks other than the black ink, various particulate organic pigments are used as the pigment particles. The organic pigments include specifically insoluble azo pigments such as Toluidine Red, Toluidine Maroon, Hanza Yellow, Benzidine Yellow, and Pyrazolone Red; soluble azo pigments such as Lithol Red; Helio Bordeaux, Pigment Scarlet, and Permanent Red 2B; derivatives of vat dyes such as alizarine, indanthrone, and Thioindigo Maloon; phthalocyanine pigments such as Phthalocyanine Blue, and Phthalocyanine Green; quinacridone pigments such as Quinacridone Red, and Quinacridone Magenta; perylene pigments such as Perylene Red, and Perylene Scarlet; isoindolinone pigments such as Isoindolinone Yellow, and Isoindolinone Orange; imidazolone pigments such as Benzimidazolone Yellow, Benzimidazolone Orange, and Benzimidazolone Red; pyranthrone pigments such as Pyranthrone Red, and Pyranthrone Orange; indigo pigments, condensed azo pigments; thioindigo pigments; diketopyrrolopyrrol pigments; Flavanthrone Yellow; Acylamide Yellow; Quinophthalone Yellow; Nickel Azo Yellow; Copper Azomethine Yellow; Perynone Orange; Anthrone Orange; Dianthraquinonyl Red; and Dioxazine Violet. Naturally, the organic pigments are not limited thereto.

The organic pigments useful in the present invention include those having Color Index Numbers as below:

C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185;

C.I. Pigment Orange 16, 36, 43, 51, 55, 59, 61, and 71;

C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272;

C.I. Pigment Violet 19, 23, 29, 30, 37, 40, and 50;

C.I. Pigment Blue 15, 15:1, 15:3, 15:4, 15:6, 22, 60, and 64;

C.I. Pigment Green 7, and 36;

C.I. Pigment Brown 23, 25, and 26.

(Resin Dispersion Type Pigment)

Resin dispersion type pigments employing a dispersant are useful as the water-insoluble coloring material for the aqueous ink of the present invention. This type of pigment requires a surfactant or a resin dispersant for dispersing the aforementioned hydrophobic pigment.

As the surfactant, anionic surfactants and nonionic surfactants are preferred. The anionic surfactants include specifically fatty acid salts, alkyl sulfate ester salts, alkylbenzenesulfonate salts, alkylnaphthalenesulfonate salts, dialkylsulfosuccinate salts, alkyl phosphate ester salts, naphthalenesulfonic acid-formalin condensates, polyoxyethylene alkyl sulfate ester salts, and substitution derivatives thereof. The nonionic surfactants include specifically polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene alkylamines, glycerin fatty acid esters, oxyethylene-oxypropylene block polymers, and substitution derivatives thereof.

The resin dispersants include block copolymers, random copolymers, and graft copolymers constituted of at least two kinds of monomers (at least one thereof being a hydrophilic monomer) selected from styrene and derivatives thereof, vinylnaphthalene and derivatives thereof, aliphatic alcohol esters of α, β-ethylenic unsaturated carboxylic acid, acrylic acid and derivatives thereof, maleic acid and derivatives thereof, itaconic acid and derivative thereof, fumaric acid and derivatives thereof, vinyl acetate, vinyl alcohol, vinylpyrrolidone, acrylamide, and derivatives thereof. The block copolymer, the random copolymer, and the like may be used in combination.

(Microcapsule Type Pigment)

Microcapsule type pigments prepared by coating a water-insoluble coloring material with an organic polymer or a like material in a microcapsule shape are useful as mentioned above as the water-insoluble coloring material for the aqueous ink of the present invention. The microcapsule can be prepared by coating the water-insoluble coloring material with an organic polymer or a like material by a chemical, physical, physico-chemical, or mechanical method, or a like method. The method includes specifically interfacial polymerization methods, in-situ polymerization methods, submerged curing-coating methods, coacervation methods (phase separation methods), submerged drying methods, melting-dispersing-cooling methods, aerial suspension coating methods, spray drying methods, acid deposition methods, and phase-inversion emulsification methods.

The organic polymers useful as the microcapsule wall film material include specifically polyamides, polyurethanes, polyesters, polyureas, epoxy resins, polycarbonates, urea resins, melamine resins, phenol resins, polysaccharides, gelatin, gum arabic, dextrans, casein, proteins, natural rubber, carboxypolymethylenes, polyvinyl alcohols, polyvinylpyrrolidones, polyvinyl acetates, polyvinyl chlorides, polyvinylidene chlorides, cellulose, ethylcellulose, methylcellulose, nitrocellulose, hydroxyethylcellulose, cellulose acetate, polyethylenes, polystyrene, (meth)acrylic acid polymers and copolymers, (meth)acrylate ester polymers and copolymers, (meth)acrylic acid-(meth)acrylate ester copolymers, styrene-(meth)acrylic acid copolymers, styrene-maleic acid copolymers, sodium arginate, fatty acids, paraffin, beeswax, liquid wax, hardened beef tallow, carnauba wax, and albumin. Of these, preferred are organic polymers which have an anionic group such as carboxyl group or a sulfonic group. The nonionic organic polymers include specifically polyvinyl alcohols, polyethylene glycol monomethacrylates, polypropylene glycol monomethacrylates, methoxypolyethylene glycol monomethacrylates, and (co)polymers thereof, cationic ring-opening polymerization products of 2-oxazoline. In particular, a complete saponification product of polyvinyl alcohol is particularly suitable because it has a low water solubility, and is readily soluble in hot water but is slightly soluble in cold water.

When the micro-capsulation is conducted by a phase reversal method or an acid deposition method, the anionic organic polymer can be used as the organic polymer for constituting the wall film of the microcapsule.

In the phase reversal method for the micro-capsulation, an organic phase is formed by mixing a composite of a self-dispersing anionic organic polymer having self-dispersibility or solubility in water with a coloring material like a self-dispersing organic coloring material, or a coloring material like a self-dispersing organic pigment or self-dispersion carbon black; a hardening agent; and an anionic organic polymer to form an organic solvent phase: the formed organic solvent phase is poured into water, or water is poured into the organic phase. In the phase reversal method, a water-soluble organic solvent or an additive for the ink may be added to the organic solvent phase. In particular, an aqueous medium for the ink is preferably added for direct production of an ink dispersion solution.

In the acid deposition method for the microcapsulation, anionic groups of the anionic group-containing organic polymer is partially or completely neutralized and blended with a coloring material like a self dispersing organic pigment or self-dispersing carbon black in an aqueous medium, and the anionic group-containing organic polymer is deposited by making the pH neutral with an acidic compound for adhesion to the pigment to prepare a water-containing cake; and the anionic groups in the cake are partially or completely neutralized with a basic compound to form microcapsules. The acid deposition method enables production of fine anionic microcapsules containing a larger pigment content.

The organic solvent useful for the aforementioned microencapsulation includes specifically alkyl alcohols such as methanol, ethanol, propanol, and butanol; aromatic hydrocarbons such as benzene, toluene, and xylene; esters such as methyl acetate, ethyl acetate, and butyl acetate; chlorinated hydrocarbons such as chloroform, and ethylene dichloride;

ketones such as acetone, methyl and isobutyl ketone; ethers such as tetrahydrofuran, and dioxane; and cellosolves such as methylcellosolve, and butylcellosolve.

The microcapsules produced in the above method can be converted to an intended microencapsulated pigment by separating once the microcapsules from the organic solvent by centrifugation or filtration and dispersing again the microcapsules in water and a necessary solvent by stirring. The microencapsulated pigment has preferably an average particle size ranging from 50 nm to 180 nm.

(Self-Dispersing Pigment)

The water-insoluble coloring material for the aqueous ink of the present invention may be a self-dispersion pigment which has high dispersibility by itself and is dispersible without a dispersant or the like as mentioned above. The self-dispersion pigment preferably has a hydrophilic group bonded chemically to the surface of the pigment particle directly or via another atomic group. For example, the hydrophilic group to be introduced onto the pigment particle surface is selected suitably from the groups of —COOM1, —SO$_3$M1, and —PO$_3$H(M1)$_2$ (where M1 denotes a hydrogen atom, an alkali metal, ammonium or an organic ammonium). The abovementioned another atomic group may be an alkylene group of 1-12 carbon atoms, a substituted or unsubstituted phenylene group, or a substituted or unsubstituted naphthylene group. Further the self-dispersion pigment suitably used includes surface-oxidation-treated self-dispersion pigments produced by oxidation treatment of carbon black with sodium hypochlorite, by oxidation of carbon black by submerged ozone treatment, by surface modification of a surface of carbon black by ozone treatment and subsequent wet oxidation by an oxidant, or by a like method.

(Polymer-Bonded Self-Dispersible Pigment)

The water-insoluble coloring material useful for the aqueous ink of the present invention may be a self-dispersion pigment which has high dispersibility by itself and is dispersion without a dispersant or the like as mentioned above. The aforementioned polymer-bonded self-dispersion pigment preferably has a reaction product of a functional group bonded directly or via another atomic group onto the surface thereof with a copolymer of an ionic monomer and a hydrophobic monomer. With this constitution, the hydrophilicity of the modified pigment can suitably be adjusted by changing the copolymerization ratio of the ionic monomer and the hydrophobic monomer of the copolymer for the surface modification. Various properties can be given to the pigment surface by changing the kinds of the ionic monomer and hydrophobic monomer employed and the combination thereof.

[Functional Group]

The polymer-bonded dispersion pigment has a functional group chemically bonded directly or via another atomic group to the surface thereof. The functional group serves to constitute an organic group by reaction with the copolymer mentioned later. The kind of the functional group is selected in consideration of the functional group of the copolymer. The reaction of the functional group and the copolymer is selected preferably such that the formed bond will not undergo hydrolysis, for example an amide linkage, in consideration of the dispersion of the pigment in an aqueous medium. For this purpose, an amino group is selected as the functional group of the pigment and a carboxyl group is introduced to the copolymer, whereby the copolymer can be bonded to the pigment surface via an amide linkage. Conversely, a carboxyl group is selected as the functional group of the pigment and an amino group is introduced to the copolymer, whereby the copolymer can be bonded to the pigment surface through an amide linkage.

The functional group bonded chemically to the pigment surface may be bonded directly or via another atomic group to the pigment surface. However, when a relatively large molecular-weight copolymer is introduced to the pigment surface, the functional group is preferably introduced thereto through another atomic group to avoid steric hindrance between the copolymer molecules. The "another atomic group" herein may be any polyvalent element or organic group without limitation. A two-valent organic radical is suitably used in consideration of control of the distance of the functional group from the pigment surface. The two-valent organic radical includes specifically alkylene groups, and arylene groups (phenylene groups).

More specifically, for instance in Examples described later, for introduction of an amino group as the functional group, a pigment is allowed to react with aminophenyl(2-sulfoethyl)sulfone to introduce an aminophenyl(2-sulfoethyl)sulfone group on the surface, and then the aminophenyl(2-sulfoethyl)sulfone is allowed to react with an amino group of pentaethylenehexamine. Thereby the amino group is chemically bonded via atomic group containing the phenyl(2-sulfoethyl) group to the pigment surface. Naturally the present invention is not limited thereto.

[Copolymer]

The copolymer of an ionic monomer and a hydrophobic monomer is preferably an anionic copolymer or a cationic copolymer.

The anionic copolymer includes copolymers of a hydrophobic monomer and an anionic monomer, or salts thereof.

The hydrophobic monomer includes specifically styrene, vinylnaphthalene, alkyl methacrylates like methyl methacrylate, phenyl methacrylate, benzyl methacrylate, 2-ethoxyethyl methacrylate, methacrylonitrile, 2-trimethylsiloxyethyl methacrylate, glycidyl methacrylate, p-tolyl methacrylate, sorbyl methacrylate, alkyl acrylates like methyl acrylate, phenyl acrylate, benzyl acrylate, acrylonitrile, 2-trimethylsiloxyethyl acrylate, glycidyl acrylate, p-tolyl acrylate, and sorbyl acrylate. The anionic monomer includes specifically acrylic acid, methacrylic acid and maleic acid. Naturally the monomers are not limited thereto.

The copolymer of the anionic monomer and the hydrophobic monomer is formed from at least two monomers: one of the above mentioned hydrophobic monomers and at least one of the above mentioned anionic monomers. The anionic copolymer includes block copolymers, random copolymers, and graft copolymers, and salts thereof.

The anionic copolymer has preferably an acid value ranging from 100 to 500, and the variation of the acid value is preferably within 20% of the average acid value. The copolymer having a higher acid value may make the pigment surface excessively. hydrophilic to retain the water and solvent of the ink on the pigment surface after printing to delay the expression of smear resistance and marker resistance, whereas the copolymer having a lower acid value may make the pigment surface excessively less hydrophilic to make the pigment less dispersion in the ink.

The salt of the anionic copolymer includes salts of alkali metals such as sodium, lithium, and potassium; and salts of ammonium, alkylamines, and alkanolamines. The salt may be used singly, or in combination of two or more thereof.

The above-mentioned cationic copolymer includes copolymers of a hydrophobic monomer and a cationic monomer, and salts thereof.

The hydrophobic monomer may be selected from the monomers mentioned before. The cationic monomer includes specifically allylamine, dimethylaminoethyl methacrylate, diethylaminoethyl methacrylate, t-butylaminoethyl methacrylate, dimethylaminoethyl acrylate, diethylaminoethyl acrylate, dimethylaminopropyl methacrylamide, N-vinylcarbazole, methacrylamide, acrylamide, and dimethyl acryamide. Naturally the cationic monomer is not limited thereto in the present invention.

The cationic copolymer of the cationic monomer and the hydrophobic monomer is formed from at least two monomers: one of the aforementioned hydrophobic monomers and at least one of the above mentioned cationic monomers. The cationic copolymer includes block copolymers, random copolymers, and graft copolymers, and salts thereof.

The cationic copolymer has preferably an amine value ranging from 100 to 500, and the variation of the amine value is preferably within 20% of the average acid value. Herein the amine value is a value represented by milligrams of KOH for neutralizing a sample corresponding to an acid value.

The aforementioned salt of the cationic copolymer includes salts of acids such as acetic acid, hydrochloric acid, and nitric acid. The salts may be used singly or in combination of two or more thereof.

The aforementioned anionic or cationic copolymer has a weight-average molecular weight (Mw) ranging preferably from 1,000 to 20,000, more preferably from 3,000 to 20,000. The cationic copolymer has a polydispersity index Mw/Mn of preferably not more than 3 (weight-average molecular weight: Mw; number-average molecular weight: Mn). Such an anionic or cationic copolymer is contained in the ink at a content preferably from 5 to 40% by mass based on the mass of the pigment particles which is surface-modified by the copolymer. The polymer of a high polydispersity index, having a broad molecular weight distribution, cannot readily express the aforementioned properties resulting from the molecular weight of the copolymer, so that the molecular weight distribution is preferably narrower.

The method of modification of the pigment by bonding chemically an organic group to the surface of the pigment particle is explained by taking carbon black as an example. Any conventional method may be employed, insofar as a copolymer of anionic monomer and a hydrophobic monomer can be chemically bonded to a functional group existing on or introduced to the pigment particle surface.

Methods therefore are shown below. In one method, polyethylenimine or the like is introduced to the surface of a pigment like carbon black, and a copolymer having an amino group formed from an ionic monomer and a hydrophobic monomer is bonded to the terminal functional group thereof by diazo reaction. In another method, a copolymer having an amino group and a carboxyl group in the molecule is bonded the pigment particle surface by a diazo reaction. Still another typical method is disclosed in WO 01/51566 A1.

In the above methods, for example, chemical bonding of an anionic copolymer to a carbon black particle surface is conducted in three steps as below:
 First Step: An aminophenyl(2-sulfoethyl)sulfone group (APSES) is added to carbon black by a diazo reaction;
 Second Step: To the APSES-treated carbon black, is added polyethylenimine, or pentaethylenehexamine (PEHA);
 Third Step: Thereto is added an ionic copolymer composed of a hydrophobic monomer and a carboxyl-containing ionic monomer.

In the above second step, the amino group of the PEHA is allowed to react with the phenyl(2-sulfoethyl)sulfone group chemically bonded in the first step to the carbon black surface, thereby introducing an amino group as the functional group bonded to the carbon black surface. Then in the third step, for example, a part of the carboxyl groups of monomer moieties of the copolymer is allowed to react with the amino group to form an amide linkage to introduce the copolymer to the carbon black surface through an atomic group containing phenyl(2-sulfoethyl) which is an APSES residue, and a PEHA residue.

In the above methods, for example, a cationic copolymer is chemically bonded to a carbon black particle surface in two steps as below:
 First Step: Aminophenyl(2-sulfoethyl)sulfone group (APSES) is bonded to carbon black by a diazo reaction;
 Second Step: A copolymer of a hydrophobic monomer and a cationic monomer is added thereto.

In the above first step, a sulfone group is bonded chemically as the functional group to the carbon black surface. Then in the second step, for example, a part of the amino groups of the ionic monomer moieties of the copolymer are allowed to react with the sulfone group (nucleophilic reaction) to introduce the copolymer to the carbon black surface through an atomic group containing a phenyl(2-sulfoethyl) group as the residue of the APSES.

<Additional Components>

The aqueous ink of the present invention may contain additionally a moisturizing agent such as urea, urea derivatives, trimethylolpropane, or trimethylolethane. The content of the moisturizing agent such as urea, urea derivatives, or trimethylolpropane ranges usually from 0.1 mass % to 20.0 mass %, preferably from 3.0 mass% to 10.0 mass % based on the total mass of the ink.

Further, the aqueous ink of the present invention may contain an additive or additives, other than the above-mentioned components, such as a surfactant, a pH-controlling agent, a rust-preventing agent, an antiseptic agent, a fungicide, an antioxidant, a reduction-preventing agent, evaporation-promoting agent, a chelating agent, and so forth.

The aqueous ink of the present invention contains preferably a nonionic surfactant for adjusting the surface tension or improving the ejection properties. The nonionic surfactant includes specifically the compounds having any of the structures shown by Structural Formulae (1)-(4):

Structural Formula (1)

(where R represents an alkyl, and n represents an integer);

Structural Formula (2)

(where R represents an alkyl, and n represents an integer),

Structural Formula (3)

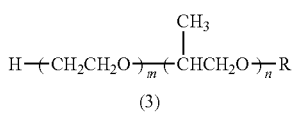

(3)

(where R represents a hydrogen atom or an alkyl; and m and n represent respectively an integer), Structural Formula (4)

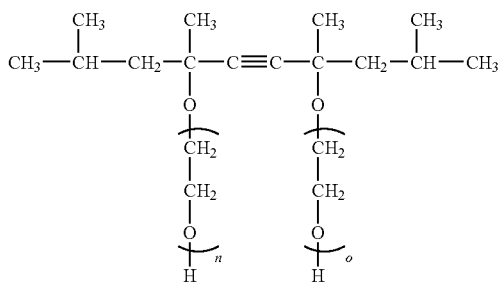

(4)

(where m and m represent respectively an integer).

In the Structural Formula (1), R is preferably a linear or branched alkyl group of 8-21 carbon atoms, and n is preferably an integer of 5-40. Two or more compounds having different R groups and/or of different n values may be used mixedly.

In the Structural Formula (2), R is preferably a linear or branched alkyl group of 8-21 carbon atoms, and n is preferably an integer of 5-40. Two or more compounds having different R groups and/or of different n values may be used mixedly.

In the Structural formula (3), preferably, m is an integer of 1-10, and n is an integer of 1-10. The symbol m denotes the number of ethylene oxide units, and n denotes the number of propylene oxide units. The compound may be any of a block copolymer, an alternating copolymer, and a random copolymer. Two or more compounds of different m and/or n values may be used mixedly.

In the Structural formula (4), preferably, m is an integer of 1-10, and n is an integer of 1-10. Two or more compounds of different m and/or n values may be used mixedly.

The compound having a structure of any of the Structural Formulae (1)-(4) is contained in the aqueous ink in the range preferably from 0.05 mass % to 5 mass %, more preferably from 0.1 mass % to 2 mass % based on the total mass of the aqueous ink.

<Properties of Ink>

The aqueous ink of the present invention comprising the above-mentioned components has preferably properties suitable for ink ejection from an ink-jet recording head. For ejection from an ink-jet recording head, the ink has properties, for example, of preferably a viscosity of 1-15 mPa·s, and a surface tension of not less than 25 mN/m (dyn/cm), more preferably a viscosity of 1-5 mPa·s, and a surface tension of 25-50 mN/m (dyn/cm).

[Reactive Solution]

The reaction liquid in the present invention comprises a reactive component for destabilizing the state of dispersion of the water-insoluble coloring material in the aqueous ink or for causing flocculation of the dispersed coloring material. The reactive component, on contact with the ink comprising the water-insoluble coloring material dispersed or dissolved by aid of a hydrophilic group, will lower the dispersion stability of the water-insoluble coloring material to cause flocculation of the water-insoluble coloring material. Herein, the lowered dispersion stability of the water-insoluble coloring material in the present invention signifies the occurrence of flocculation or gelation on mixing of the ink with the reaction liquid. The first aqueous ink and the second aqueous ink may be applied onto a recording medium not having been treated with or having been treated with the reaction liquid.

The reactive component includes specifically metal salts (especially polyvalent metal ions, and salts thereof), low molecular cationic compounds, and cationic polymers. The reactive component is explained below.

(Polyvalent Metal Ions and Salts Thereof)

The polyvalent metal ions include specifically divalent metal ions such as $Ca^{2+}$, $Cu^{2+}$, $Ni^{2+}$, $Mg^{2+}$, $Zn^{2+}$, $Sr^{2+}$, and $Ba^{2+}$; and trivalent metal ions such as $Al^{3+}$, $Fe^{3+}$, $Cr^{3+}$, and $Y^{3+}$. The polyvalent metal ion can be incorporated by adding the polyvalent metal salt into a reaction liquid. The salt signifies the metal salt constituted of the above polyvalent metal ion and a counter anion, and should be soluble in water. The preferred anion for the salt formation includes $Cl^-$, $NO_3^-$, $I^-$, $Br^-$, $ClO_3^-$, $SO_4^{2-}$, $CO_3^{2-}$, $CH_3COO^-$, and $HCOO^-$. Naturally the anion is not limited thereto in the present invention. In the present invention, the polyvalent metal ion is selected preferably from $Ca^{2+}$, $Mg^{2+}$, $Sr^{2+}$, $Al^{3+}$, and $Y^{3+}$ in view of the reactivity of the reaction liquid with the aqueous ink, and coloring properties and ease of handling of the reaction liquid. Of these metal ions, $Ca^{2+}$ is particularly preferred. As the anion, $NO_3^-$ is particularly preferred in view of the solubility and other properties.

The polyvalent metal is contained in the reaction liquid preferably at a content ranging from 0.01 mass % or more to 10 mass % or less, more preferably from 1.0 mass % or more to 5 mass % or less based on the total mass of the reaction liquid in view of the effect of the present invention. In particular, the content of the polyvalent metal ion, ranges preferably 2.0 mass % or more to 4.0 mass % or less based on the total mass of the reaction liquid for obtaining sufficient performance for destabilizing the dispersion state of the water-insoluble coloring material contained in the aqueous ink and for obtaining high level of image density. The content of the polyvalent metal ion in the reaction liquid may be more than 10 mass %. However, the excessively high content of 10 mass % or more of the polyvalent metal ion is not necessary because the higher content will not remarkably improve the property of destabilizing the dispersion state of the water-insoluble.

The reaction liquid preferably does not contain a coloring material and is transparent, but may be light-absorptive in visible wavelength region: The reaction liquid may be light-absorptive, insofar as it does not affect substantially the image quality.

(Means for Application of Reactive Solution)

The reaction liquid can be applied on a recording medium by roller coating, bar coating, spray coating, or a like method. Further, the reaction liquid can be applied by an ink-jet recording method similarly as the ink for selective application of the reaction liquid to the image formation region on which the ink is applied and to the vicinity thereof. According to the investigation by the inventors of the present invention, the roller coating method is found to be the most suitable. This is because the reactive component distributes uniformly in comparison with other application means on or near the surface layer of the recording medium, and the solid print portion is less irregular and the ink strike-through is less to give high quality of the image, even when the application amount of the reaction liquid is lower.

In image formation by a two-liquid system, the reaction liquid can be brought into contact with the aqueous ink in various manners. In the image formation with the two aqueous inks of the present invention, the aqueous inks are preferably applied to the recording medium after the droplets of the reaction liquid are absorbed by the recording medium and the reaction liquid is solution is fixed. The reason is as follows. When the aqueous ink and the reaction liquid are brought into contact both in a liquid state, the reactivity of the aqueous ink with the reaction liquid may cause graininess at the lower image density portion, impairing the characteristic in the lower image portion of the present invention. This graininess in this state in the lower image density portion is found to be comparable to image formation with conventional inks without the effect of the present invention.

The time of completion of fixation in the present invention signifies the time when the value of $Ka(t-t_w)^{1/2}$ in the aforementioned Bristow's equation exceeds the actually application amount of the reaction liquid on the recording medium. At this time, the reaction liquid droplets have been absorbed by the recording medium. This signifies that the fixation is completed "t" seconds after the application estimated from the Ka value of Bristow's equation and the application amount of the liquid composition.

(Properties and Application Amount of Reaction Solution)

The permeability of the reaction liquid into the recording medium is represented by the Ka value of the Bristow's equation, and is in the range preferably from 1.3 $mL \cdot m^{-2} \cdot msec^{-1/2}$ or more to 6.0 $mL \cdot m^{-2} \cdot msec^{-1/2}$ or less, more preferably from more than 3.0 $mL \cdot m^{-2} \cdot msec^{-1/2}$ to 6.0 $mL \cdot m^{-2} \cdot msec^{-1/2}$ or less. The amount of application of the reaction liquid ranges preferably from 0.5 $g/m^2$ or more to 5 $g/m^2$ or less, more preferably from more than 2.0 $g/m^2$ to 3.0 $g/m^2$ or less.

The amount of application of the reaction liquid can suitably be adjusted by the physical properties of the reaction liquid, the roller rotation rate, the roller contact pressure against the recording medium, and so forth.

The reaction liquid need only react with the aqueous ink in the present invention. Therefore, the surface tension of the reaction liquid is preferably made higher for preventing running of the reaction liquid outside the recording area of the aqueous ink of the present invention insofar as the ink can be ejected from the recording head, and is preferably made higher than the surface tension of the aqueous ink to destabilize the dispersion state of the water-insoluble coloring material by the reaction liquid.

[Image-Forming Method]

An image forming method according to the present invention is explained specifically below. The image forming method according to the present invention comprises at least a step of a first mode in which higher-density recording is conducted with a first ink comprising a good medium or good mediums for the water-insoluble coloring material and a poor medium or poor mediums for the water-insoluble coloring material and another step of a second mode in which lower-density recording is conducted with a second ink comprising a good medium or good mediums, and the ratio of B/A in the second aqueous ink is less than the ratio of B/A in the first aqueous ink, A denotes the total content (mass %) of good medium based on the total mass of the aqueous ink and B denotes the total content (mass %) of poor medium based on the total mass of the aqueous ink, and the second aqueous ink has the same hue as first aqueous ink.

In the present invention, the image density is assumed to be proportional to the amount of the applied ink. The term "a lower image density portion" signifies a portion where a smaller amount of ink has been applied, and the term "higher image density portion" signifies a portion where a larger amount of ink has been applied.

More specifically, for example, "100% duty" is defined to be a duty of image formation at a resolution of 1200 dpi×1200 dpi with 14400 ink droplets having a volume of 4 ng per droplet. In one image, portions of 80% or higher duty and boundary portions between different hues (e.g., an image formed with a color ink of a cyan ink, a magenta ink, and a yellow ink) are formed with the first aqueous ink, and portions of less than 20% duty are formed with the second ink. The intermediate duty portions of 20% or more to less than 80% duty are formed by combination of the first aqueous ink and the second aqueous ink. Incidentally, the levels of the above resolution, the number of the ink droplets, and the duty are mentioned as examples, and the present invention is not limited thereto.

In the image forming method according to the present invention for image formation by an ink-jet recording method on a plain paper with a black ink and at least one aqueous color ink, the aforementioned aqueous black ink of the present invention is used as the black ink; and in formation of an image composed of an image formed with the black ink and an image formed with the color ink are adjacent to each other, performing scanning for applying the black ink to form the image and thereafter performing, scanning for applying the color into the area where the image has been formed by the precedent scanning.

In the image forming method of the present invention, when the first aqueous ink and the second aqueous ink are both a black ink and the other ink is a color ink, a high-density image can be formed with low graininess with effective prevention of bleeding. The reason therefore is considered as below.

Generally recording mediums having gloss (glossy recording mediums) are designed to absorb quickly the applied ink to cause little running. On the contrary, plain papers and like recording mediums are liable to cause ink running in comparison with glossy recording mediums. Therefore, the effect of the present invention can be achieved effectively by use of the first aqueous ink and the second aqueous ink in place of usual black ink for printing on a plain paper.

The technique of the image forming method of the present invention is explained specifically by reference to FIGS. 7-12 illustrating the constitution of a recording head for the method. In these drawings, lines of ink ejection orifices are indicated by the same reference symbols BKI, BKII, C, M, Y, and so forth as the symbols for the kinds of the inks ejected from the ejection orifice lines.

For full-color image formation according to the present invention, the recording head has black ink ejection orifice lines for ejecting the black ink and color ink ejection orifice lines for ejecting the color ink which are preferably arranged respectively in a secondary scanning direction 71 in the recording head. In formation of an image of black only, the entire of the black ink ejection orifice lines are preferably used, whereas in formation of a full color image in which a black image and a color image are mingled, portions of the black ink ejection orifice lines and the entire of the color ink ejection orifice lines are preferably used.

Figure 7:
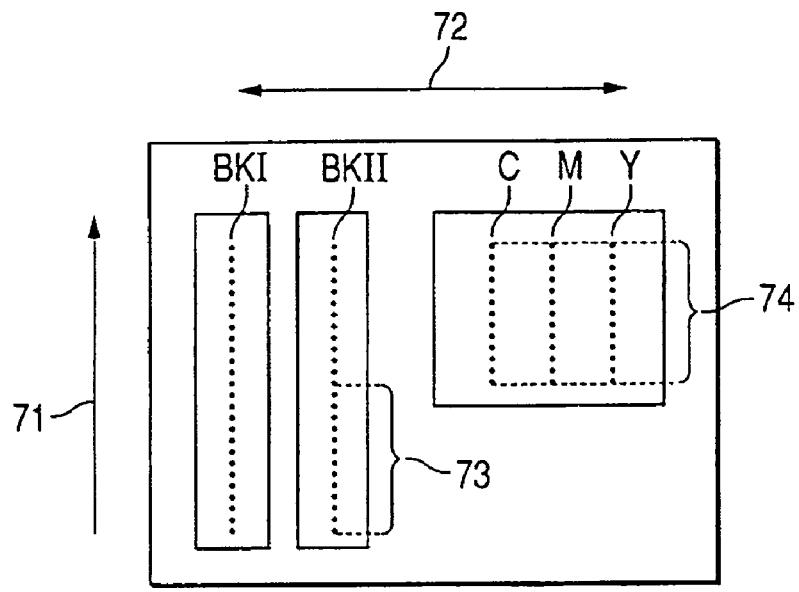
FIG. 7 illustrates a constitution of a recording head.

The recording head shown in FIG. 7 has ejection orifice lines BKI and BKII for ejecting a first aqueous ink BKI and a second aqueous ink BKII, ejection orifice lines C, My and Y for ejecting respectively a color ink of cyan (C), magenta (M), or yellow (Y). Firstly, a black image data is formed on a recording medium by a one-pass printing method by scanning the printing head in the primary scanning direction 72 by using portions 73 of the black ink ejection orifice lines (BKI and BKII). Next, the recording medium is delivered in secondary scanning direction 71 by a distance "a" corresponding to the portions 73. In the following process of forward scanning with the printing head, a color image is formed by use of portions 74 of the color ink ejection orifice lines by one-pass printing on the region of the image having been formed with the portions 73 of the black ink ejection orifice lines (BKI and BKII). During this color printing process, the portions 73 of the black ink ejection orifice lines (BKI and BKII) form an image on the next region. By repeating the above process, an entire image is formed in which a black image and a color image are mingled.

Figure 8:
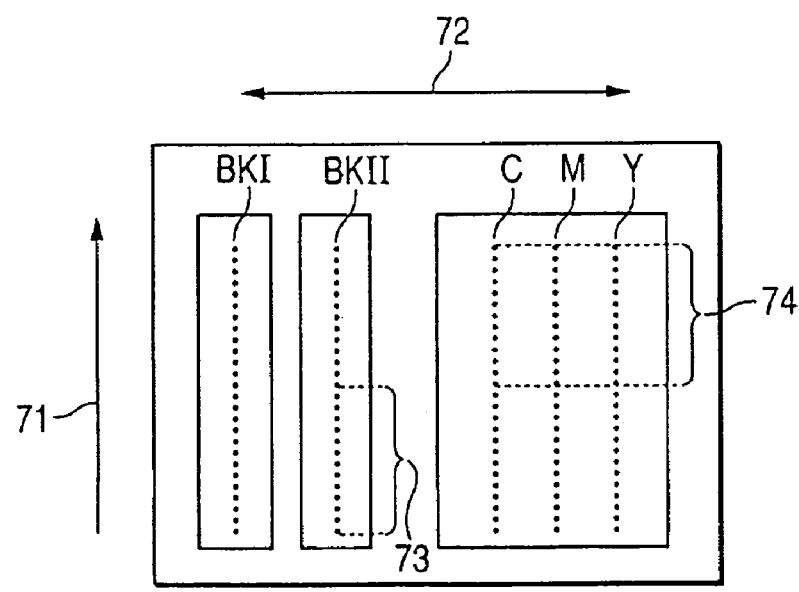
FIG. 8 illustrates a constitution of another recording head.

The recording head shown in FIG. 8 also applies black ink by use of portions 73 of black ink ejection orifice lines BKI and BKII, and color inks C, M, and Y are applied by use of portions 74 of color ink ejection orifice lines to form an entire image in which a black image and a color image are mingled.

Figure 9:
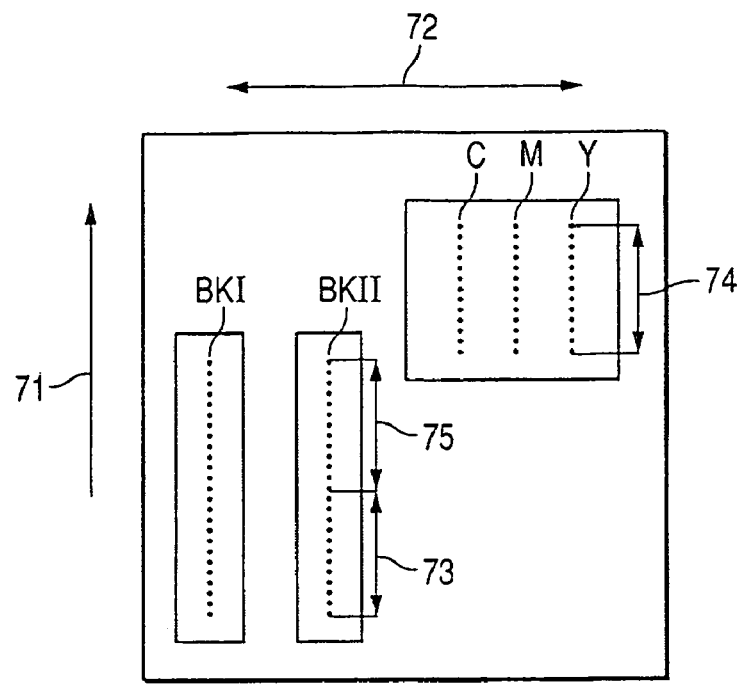
FIG. 9 illustrates a constitution of still another recording head.

The recording head shown in FIG. 9 forms an image having a black image portion and a color image portion mingled, in the same manner as in Example 7. In the recording head shown in FIG. 9, portions 75 are provided, corresponding to one-step delivery distance a' of the paper sheet delivery, between portions 73 of black ink ejection orifice lines (BKI and BKII) and portions 74 of color ink ejection orifice lines. With this constitution of the head, a time difference of one reciprocating scanning movement is provided between the black image formation and the color image formation. Thereby, the recording head having the constitution shown in FIG. 9 is more advantageous than that shown in FIG. 8 in prevention of ink bleeding between the black image and the color image.

Figure 10:
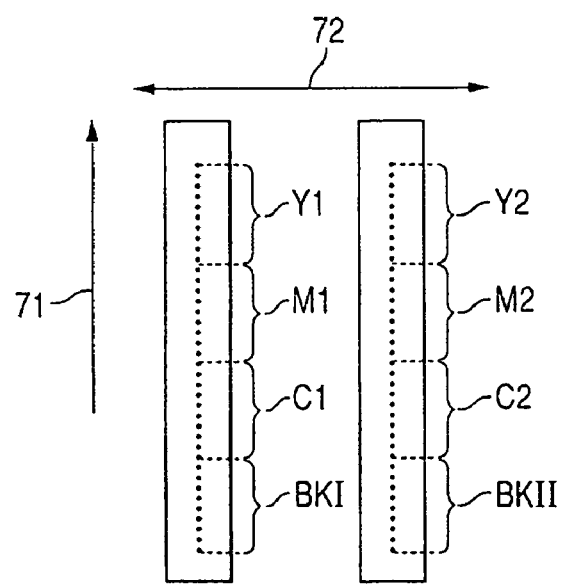
FIG. 10 illustrates a constitution of still another recording head.

The recording head shown in FIG. 10 has one ejection orifice line for each kind of ejection orifices arranged respectively in secondary scanning direction 71. With this constitution, a color image, is formed after the black image is formed.

Figure 11:
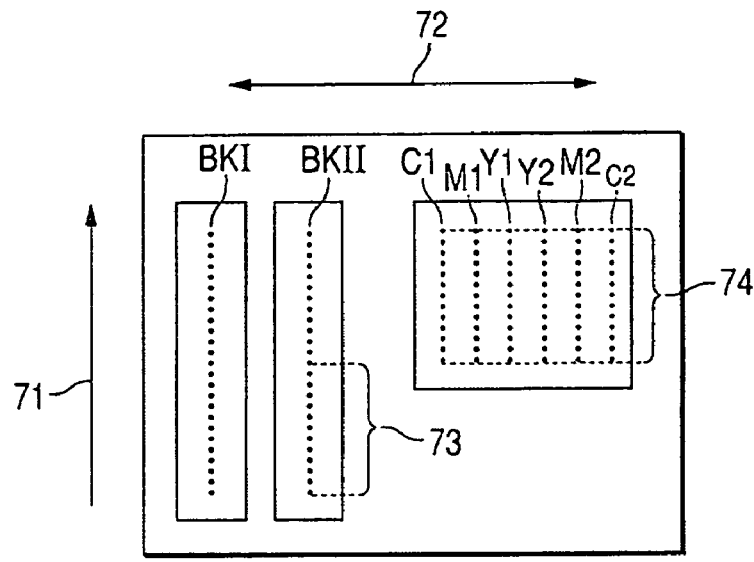
FIG. 11 illustrates a constitution of still another recording head.

The recording head shown in FIG. 11 has two sets of color ink ejection orifice lines for a cyan ink, a magenta ink, and a yellow ink (a set of C1, M1, and Y1; and a set of C2, M2, and M3), the lines being arranged in the primary scanning direction. In the two sets, the arrangement order of the colors is reversed such that the color application order is not changed in the forward scanning and the backward scanning in the primary scanning direction. Firstly, in the forward primary scanning, a black image is formed by use of portions 73 of black ink ejection orifice lines (BKI and BKII). Then the recording medium is sent by distance "a" in the secondary scanning direction. Then a color image is formed by use of portions 74 of the color ink ejection orifice lines by one-pass printing in backward primary scanning of the print head on the image region having been formed in the forward primary scanning with portions 73 of the black ink ejection orifice lines. During this color printing process, the portions 73 of the black ink ejection orifice lines (BKI and BKII) form an image on the next region. By repeating the above process, an entire image having a black image and a color image mingled is formed effectively by ink application by forward and backward scanning of the printing head in the primary scanning direction.

Figure 12:
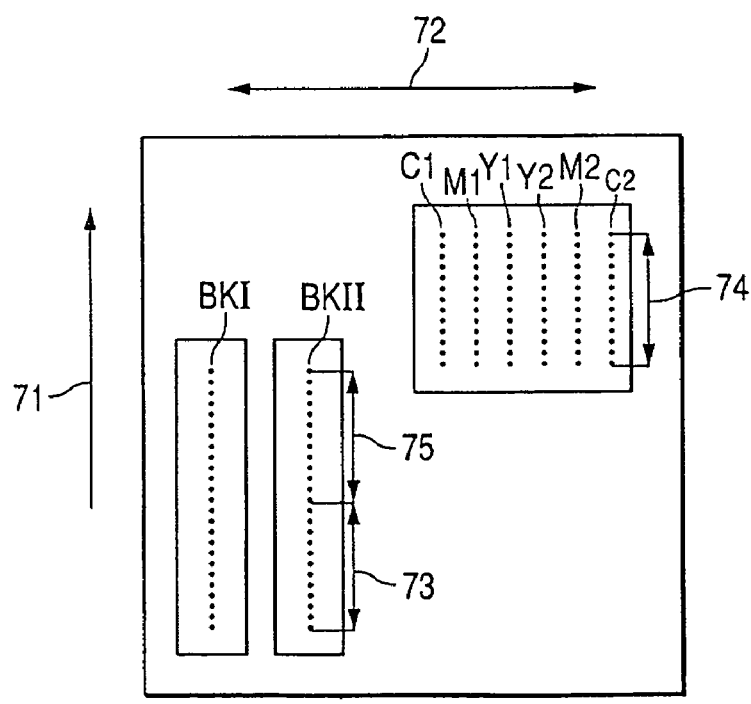
FIG. 12 illustrates a constitution of still another recording head.

The recording head shown in FIG. 11 which is capable of two-direction recording may be modified, similarly as the recording head shown in FIG. 9, to have an arrangement shown in FIG. 12. In this arrangement, a distance 75 is provided corresponding to one-step sheet delivery distance a' between portions 73 of black-ink ejection orifice lines and portions 74 of color ink ejection orifice lines. With this constitution of the head, a time difference of one reciprocating scanning is provided between the black image formation and the color image formation, to prevent advantageously ink bleeding between the black image and the color image.

The image forming method of the present invention is explained above. Naturally, the type of the recording head for the image forming method of the present invention is not limited to those shown in FIGS. 7-12. Since the printing pass number depends on the type recording apparatus, the present invention is not limited to one-pass printing system.

<Ink Sets>

The first ink and the second ink may be combined with another ink as an ink set. The ink set may be constituted of any combination of plural inks mentioned below. The ink set may be an integrated ink tank constituted of color ink tanks of holding respectively a cyan ink, a magenta ink, a yellow ink, and a black ink, or combination thereof with a head; an integrated ink tank constituted of color ink tanks of holding respectively a cyan ink, a magenta ink, and a yellow ink, or combination thereof with a head; or combination of ink tanks which are respectively demountable from a recording apparatus. Naturally, the ink set is not limited thereto, and any modification is acceptable.

[Ink-Jet Recording Method, Recording Unit, Cartridge, and Inkjet Recording Apparatus]

An example of a preferred ink-jet recording apparatus for the present invention is explained below.

FIG. 1 is a schematic sectional view of an example of an ink-jet recording apparatus. The ink-jet recording apparatus may be of a two-liquid system. The ink-jet recording apparatus shown in FIG. 1 is of a serial type ink-jet recording system, comprising recording head 1; sheet-feeding cassette 16 constituted in integration of sheet-feeding tray 17 for feeding recording medium (hereinafter recording sheets) 19, and a means for applying a reaction liquid; a driving means for driving the recording head in reciprocation in a direction (primary scanning direction) perpendicular to the sheet-feeding direction (secondary scanning direction); and a control means for controlling the drive of the above constituting elements.

Recording head 1 is mounted on carriage 2 with the face thereof having ink ejection orifices facing to platen 11. Recording head 1 has ink ejection orifices, electrothermal transducers for heating the ink liquid (e.g., heat generating resister element) and a base plate for supporting them, although not shown in the drawing. Recording head 1 has an ink cartridge in the upper carriage portion.

Carriage 2 carries recording head 1, and is movable in reciprocation along two guide shafts 9 extending in parallel in the breadth direction of recording sheet 19. Recording head 1 is driven synchronously with reciprocating movement of the carriage to eject ink droplets onto recording sheet 19 to form an image. Sheet-feeding cassette 16 is demountable from the main body of the ink-jet recording apparatus. Recording sheets 19 are stored in sheet-feeding tray 17 in sheet-feeding cassette 16. In sheet feeding, the uppermost sheet is pushed against sheet-feeding roller 10 by spring 18 for pushing upward sheet-feeding tray 17. This sheet-feeding roller 10 has a sectional shape of nearly a semicircle, and is driven by a motor not shown in the drawing to feed only the uppermost sheet (recording sheet 19) by aid of a separating claw (not shown in the drawing).

Recording sheet 19 fed separately is delivered by intermediate roller 12 having a larger diameter and application roller 6 having a smaller diameter press-contacted therewith along the delivery face of sheet-feeding cassette 16 and the delivery face of paper guide 27. The delivery faces are curved in a form of an arc concentric with intermediate roller 12. The delivery direction of recording sheet 19 is reversed by passing on the delivery faces. Thereby, the printing face of recording sheet 19 is directed downward during delivery from sheet-feeding tray 17 before reaching intermediate roller 12, and is directed upward (toward the recording head) when the recording sheet comes to confront recording head 1. Therefore, the printing face of the recording sheet is directed invariably to the outside of the ink-jet recording apparatus.

The reaction liquid-applying means is provided in sheet-feeding cassette 16, the means comprising replenishing tank 22 for feeding reaction liquid 15, intermediate roller 12 supported rotatably with a part of the peripheral face immersed in tank 22, and applying roller 6 being placed parallel to and in contact with intermediate roller 12 and rotating in the same direction. Application roller 6 is placed to be in contact at the periphery with intermediate roller 12 for delivering recording sheet 19 and to be parallel to the intermediate roller. During the delivery of recording sheet 19, application roller 6 is rotated by rotation of intermediate roller 12. Thereby, the aforementioned reaction liquid 15 is supplied by feeding roller 13 to the peripheral face of applying roller 6, and further the reaction liquid is applied evenly by applying roller 6 onto the printing face of recording sheet 19 held between applying roller 6 and intermediate roller 12.

This ink-jet recording apparatus has float 14 in replenishing tank 22. This float 14 has a specific gravity lower than reaction liquid 15 and floats on the surface of the reaction liquid, enabling visual confirmation of the level of the reaction liquid containing the reactive component from the outside through transparent level-indicating window 21.

FIG. 2 is a front view of the liquid level indicator part. The indicator part is graduated for the remaining liquid quantity along the length direction of level-indicating window 21. In FIG. 2, the position of "Full" of the level of the reaction liquid or the level of the float shows that the reaction liquid is full in the tank, whereas the position of "Add" of the level of the reaction liquid or the float shows that the reaction liquid is remaining in a small amount. Therefore the necessity of replenishing the reaction liquid is readily recognized.

Figure 3:
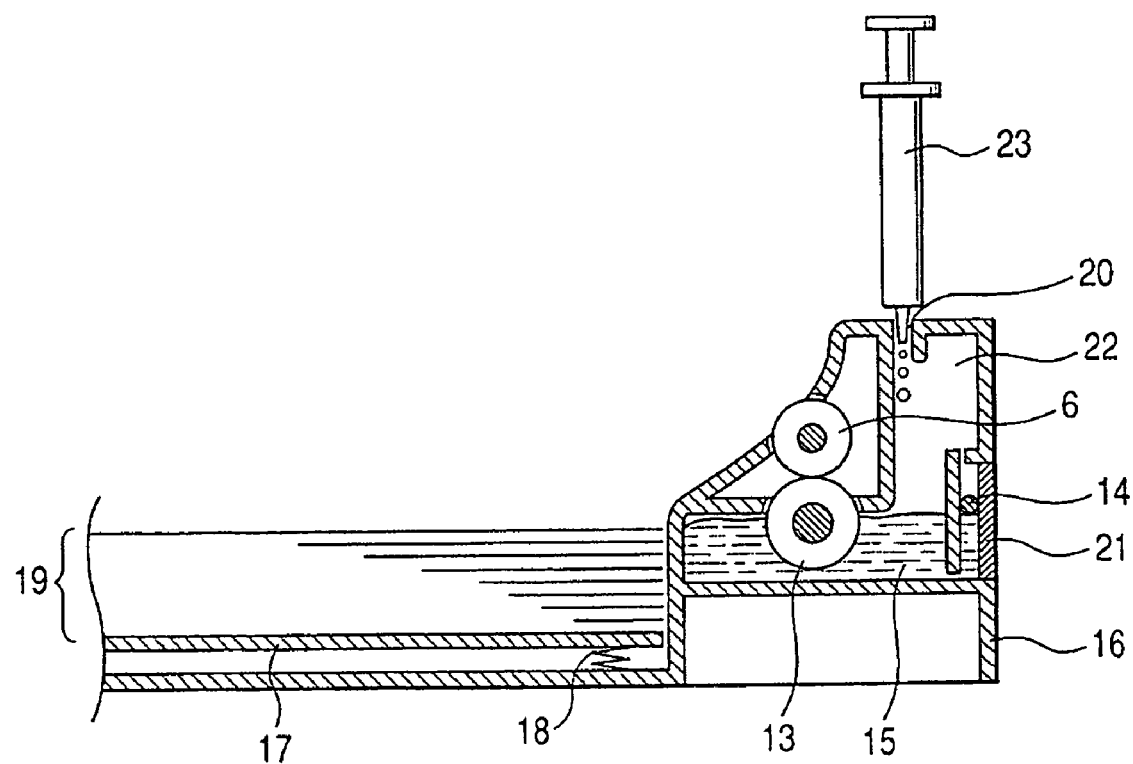
FIG. 3 is a schematic side view illustrating replenishment of the reaction liquid to the ink-jet recording apparatus shown in FIG. 1.

FIG. 3 shows replenishment of the reaction liquid. Sheet-feeding cassette 16 is drawn out of the main body of the recording apparatus. In this state, a tip of injection syringe 23 is inserted into a break of injection opening 20 made of rubber to inject the reaction liquid into replenishing tank 22.

The recording sheet having been coated with the reaction liquid is delivered by a prescribed distance by main delivery roller 7 and pinch roller 8 press-contacted therewith to the recording section, where an ink is applied by recording head 1. In the above constitution, recording sheet 19 after the feeding and the printing is discharged by sheet-discharging roller 3 and spur 4 press-contacted therewith and stacked on discharged sheet tray 5.

For application of the reaction liquid by a roller or the like, the viscosity of the reaction liquid is preferably higher, since reaction liquid of a higher viscosity destabilizes effectively the ink even with a smaller amount of application and promoting fixation of the record. More specifically, the higher viscosity of the reaction liquid tends to cause the polyvalent metal ions to remain near the surface and to facilitate effectively the reaction of the ions with the ink. After the reaction of the ink with the reaction liquid, the coloring material component in the ink will stay near the surface of the recording medium, whereas the water-soluble organic solvent, water and the like will permeate quickly into the recording medium. That is, the solid-liquid separation is preferably caused quickly. In view of the fixation of the recorded matter, the reaction liquid has preferably a lower viscosity. For application with the reaction liquid with a roller, the viscosity of the reaction liquid ranges preferably from 3 to 100 mPa·s, more preferably from 5 to 60 mPa·s. Incidentally, the viscosity of the reaction liquid or the ink is measured at 25° C. according to a conventional method.

Figure 4:
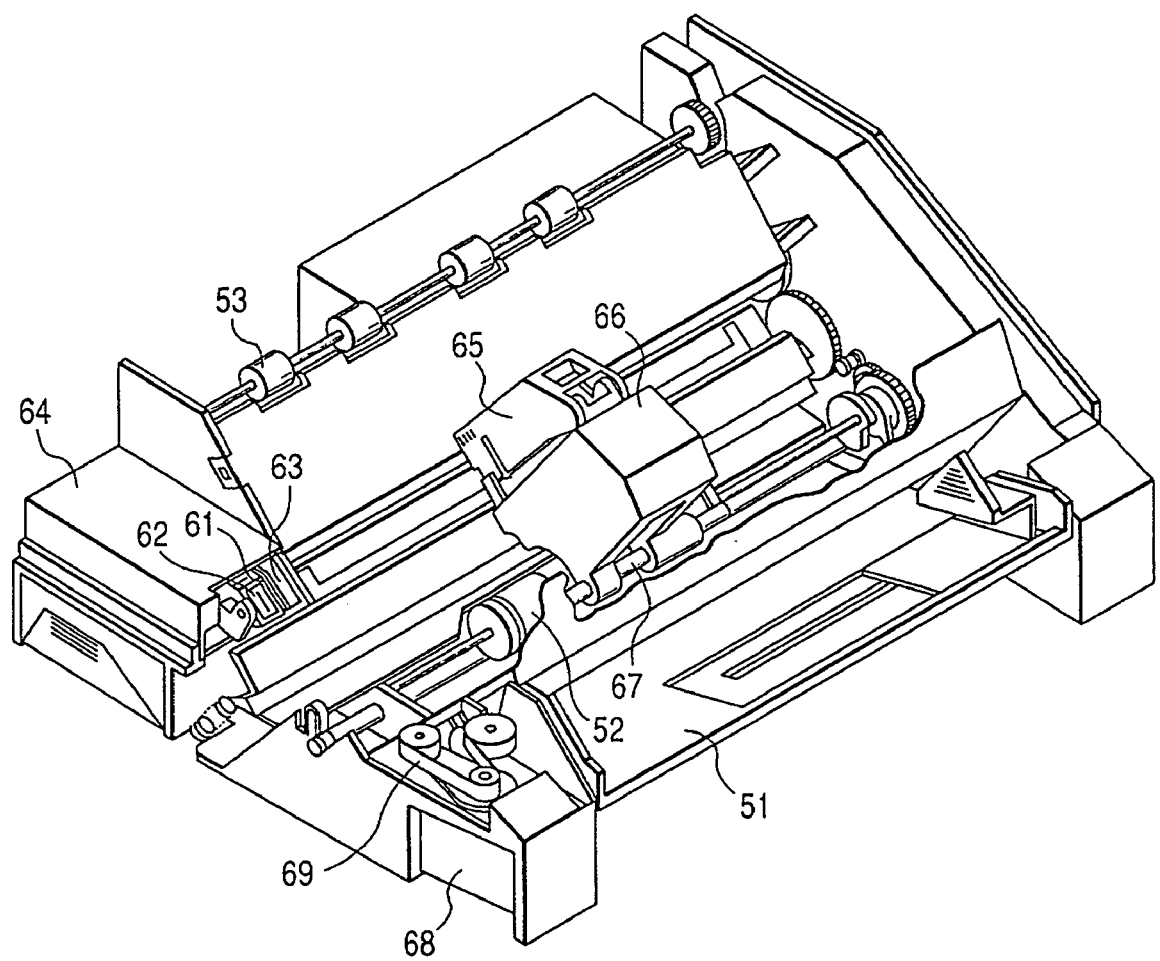
FIG. 4 is a schematic perspective view of an ink-jet recording apparatus.

FIG. 4 illustrates another example of the ink-jet recording apparatus. In FIG. 4, blade 61 as a wiping member is held at one end of the blade by a blade-holding member, forming a fixed end in a shape of a cantilever. Blade 61 is placed at a position adjacent to the recording region of recording head 65, and, in this example, is held so as to protrude into the moving path of recording head 65.

A cap 62 for capping the protrusion face of recording head 65 is placed at the home position adjacent to the blade 61, and is constituted such that it moves in the direction perpendicular to the moving direction of the recording head to come into contact with the ejection nozzle face to cap the nozzle. Ink absorbent 63 is placed at a position adjacent to blade 61, and is held so as to protrude into the moving path of recording head 65 similarly as blade 61. Blade 61, cap 62, and ink absorbent 63 constitute an ejection recovery device 64. Blade 61, and ink absorbent 63 serve to remove water, dust, and the like from the face of the ink ejection nozzle. Further, a recovery unit is provided which sucks an ink or the like at the ejection orifice for the reaction liquid to recover the inherent performance of ejecting the ink or the reaction liquid.

Recording head 65 has an energy-generating means for the ejection, and conducts recording by ejecting the ink onto a recording medium opposing to the ejection nozzle face. Carriage 66 is provided for supporting and moving the recording head 65. Carriage 66 is connected slidably to guide rod 67. A portion of carriage 66 is connected (not shown in the drawing) to belt 69 driven by motor 68. Thereby carriage 66 is movable along guide rod 67 to the recording region of recording head 65 and the adjacent region thereto. Recording sheet is fed through recording sheet inlet 51. Recording sheet delivery roller 52 is driven by a motor (not shown in the drawing).

With the above constitution, with the progress of the recording, the recording sheet is delivered to the front of the ejection orifices of recording head 65, and is delivered further to a paper discharge device provided with paper sheet-discharging rollers 53. In the above constitution, when recording head 65 returns to the home position on completion of recording, cap 62 of ejection-recovery device 64 is positioned out of the moving path of recording head 65, and blade 61 is allowed to protrude to the moving path. Thereby, the ejecting nozzle face of recording head 65 is wiped. For capping the ejection face of recording head 65, cap 62 protrudes toward the moving path of recording head 65 to come into contact with the ejection nozzle face. When recording head 65 is moved from the home position to the record-starting position, cap 62 and blade 61 are at the same position as in the above-mentioned wiping step, so that the ejection nozzle face of recording head 65 is wiped also in this movement.

The recording head is moved to the home position not only at the completion of the recording and for ejection recovery, but is also moved at a predetermined intervals during recording from the recording region. The nozzle is wiped by this movement.

Figure 5:
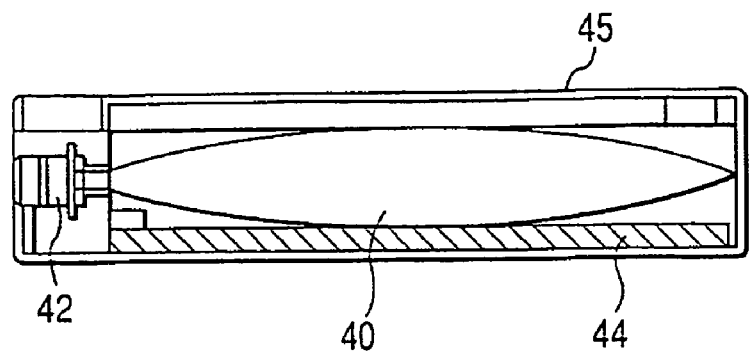
FIG. 5 is a sectional view of an ink cartridge.
Figure 6:
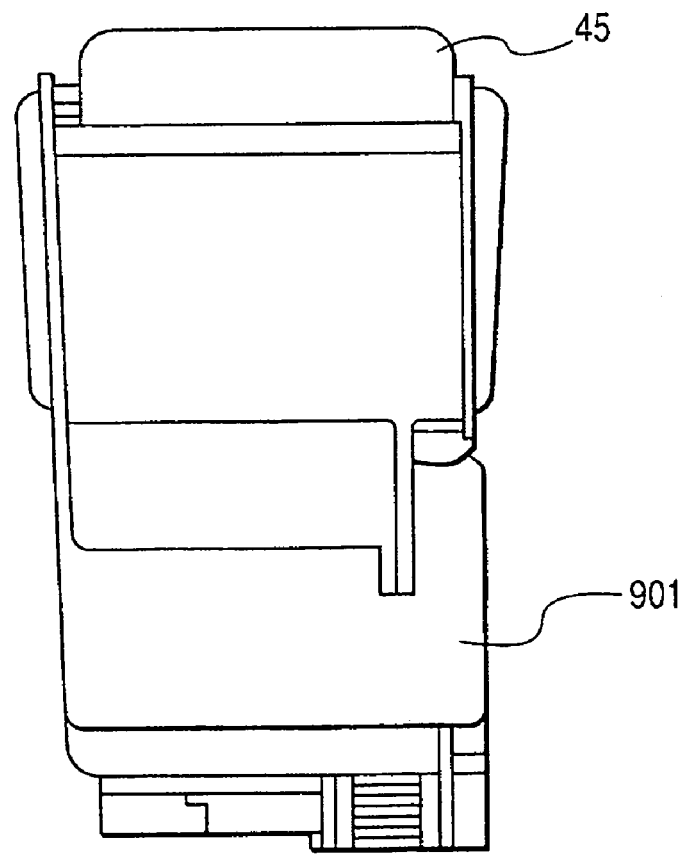
FIG. 6 is a schematic plan view of a recording head with the ink cartridge set thereto.

FIG. 5 is a sectional view of an example of ink cartridge 45 which holds an ink or a no-ink-containing reaction liquid to be supplied through an ink supplying member such as a tube. Ink container 40, for example, a bag, contains an ink or a reaction liquid to be supplied, having rubber plug 42 at the tip. Insertion of a needle (not shown in the drawing) into plug 42 enables supply of the ink from ink bag 40 to the head. Waste-ink absorbent 44 serves to absorb a waste ink. The liquid-contacting face of ink container 40 to be brought into contact with the ink or the reaction liquid is preferably formed from polyolefin, especially polyethylene. Such a type of cartridge is constructed to be attachable to and detachable from recording head 901 as shown in FIG. 6, and the ink or the reaction liquid is supplied from attached cartridge 45 to recording head 901.

EXAMPLES

The present invention is explained below specifically by reference to Examples and Comparative Examples. The present invention is not limited by the Examples within the gist of the present invention. In the description, the units "part(s)" and "%" are based on mass unless otherwise mentioned.

[Preparation of Pigment Dispersion Solution]

(Preparation of Black Pigment Dispersion Solution 1)

A styrene-acrylic acid copolymer having an acid value of 200 and a weight-average molecular weight of 10,000 was neutralized with a 10 mass % sodium hydroxide solution. A 10 parts of carbon black having a specific surface area of 210 $m^2/g$ and a DBP oil absorption value of 74 mL/100 g, 20 parts of aqueous solution of the above neutralized styrene-acrylic acid copolymer, and 70 parts of deionized water were dispersed for one hour by means of a sand grinder. The resulting dispersion solution was centrifuged to remove coarse particles, and was press-filtered through a micro-filter (Fuji Film Co.) of a pore sized of 3.0 μm to obtain Resin Dispersion Type Pigment 1. To the above obtained Resin Dispersion Type Pigment 1, water was added to prepare a dispersion solution of pigment concentration of 10 mass %. As described above, Black Pigment Dispersion Solution 1 was prepared.

(Preparation of Black Pigment Dispersion Solution 2)

A 10 g of carbon black having a specific surface area of 230 $m^2/g$ and a DBP oil absorption value of 70 mL/100 g, 3.41 g of p-amino-N-benzoic acid, and 72 g of water were mixed well. Thereto, 1.62 g of nitric acid was added dropwise, and the mixture was stirred at 70° C. Several minutes later, a solution of 1.07 g of sodium nitrite in 5 g of water was added thereto, and the mixture was stirred further for one hour. The resulting slurry was filtered through a filter paper (trade name: Standard Filter Paper No. 2; Advantec Co.). The collected particulate matter was washed well with water, and dried in an oven at 90° C. to obtain self-dispersion Carbon Black 2. To the above obtained self-dispersion Carbon Black 2, water was added to prepare a dispersion solution of pigment concentration of 10 mass %. As described above, Black Pigment Dispersion Solution 2 was prepared which contains self-dispersion type Caron Black 2 having a hydrophilic group introduced via a phenyl group to the surface of carbon black particle and being charged anionically

[Judgment of Water-Soluble Organic Solvent into Good Solvent and Poor Solvent]

For selection of a water-soluble organic solvent as the good medium and the poor medium for the pigment in the pigment dispersion solution, the experiments below were conducted. Firstly, aqueous solutions were prepared which contain the above Pigment Dispersion Solution 1 or 2 at a solid content of 10 mass %. With these dispersion solutions and water-soluble organic solvents, Solvent-Judgment dispersion solution A and Solvent-Judgment water dispersion solution B were prepared for judging the water-soluble solvent between the good medium and the poor medium.

| (Solvent-Judgment dispersion solution A) | |
|---|---|
| each Black Pigment Dispersion Solution of solid content of 10 mass % | 50 parts |
| each water-soluble organic solvent shown in Table 1 | 50 parts |
| (Solvent-Judgment water dispersion solution B) | |
| each Black Pigment Dispersion Solution of solid content of 10 mass % | 50 parts |
| pure water | 50 parts |

(Method of Judgment)

A 10 g of the each Solvent-Judgment dispersion solution A for judgment between the good medium and the poor medium is placed in a transparent glass-stoppered sample bottle. After the bottle was stoppered, the liquid was sufficiently agitated, and kept standing in an oven at 60° C. for 48 hours. The dispersion solution after the heat treatment was subjected to measurement by means of a fiber-optics particle analyzer (trade name: FPAR-1000; Otsuka Denshi K.K.). The particle size measured after the heat-treatment at 60° C. for 48 hours (measured without dilution) was taken as the average particle size of the pigment in Solvent-Judgment dispersion solution A. On the other hand, Solvent-Judgment water dispersion solution B not heat-treated was subjected to average particle size measurement by the fiber-optics particle analyzer in the same manner as above. The water-soluble organic solvent which makes the average pigment particle size of Solvent-Judgment dispersion solution A larger than that of Solvent-Judgment water dispersion solution B is classified as a poor medium, whereas the water-soluble organic solvent which keeps the average pigment particle size of Solvent-Judgment dispersion solution A to be equal to that of Solvent-Judgment water dispersion solution B or makes the average pigment particle size smaller than that of Solvent-Judgment water dispersion solution B is classified as a good medium.

[Measurement of Ka Value of Water-Soluble Organic Solvent]

For measurement of Ka of the water-soluble organic solvent, an aqueous 0.5 mass % dye solution was prepared which has the composition shown below. This aqueous dye solution was prepared in order to color a colorless transparent sample to make it visible so that the Ka value can be easily measured.

| Water-soluble dye C.I. Direct Blue 199 | 0.5 parts |
|---|---|
| Pure water | 99.5 parts |

Next, using this aqueous 0.5 mass % dye solution and each water-soluble organic solvent to be measured, each of aqueous 20% solution of colored water-soluble organic solvents having the composition shown below was prepared.

| Above-mentioned aqueous 0.5 mass % dye solution | 80 parts |
|---|---|
| Water-soluble organic solvent described in Table 1 | 20 parts |

The above-prepared aqueous 20 mass % water-soluble organic solvent solution was subjected to measurement of the Ka value of the aqueous 20 mass % water-soluble organic solvent solution according to Bristow method by means of a dynamic permeability tester (trade name: Dynamic Permeability Tester S; Toyo Seiki Seisakusho K.K.)

[Classification and Measurement Results]

Table 1 shows the results of classification of the water-soluble organic solvent for the ink into good mediums and poor mediums for Black Pigment Dispersion Solvents 1 and 2, and the measured Ka values of aqueous 20 mass % water-soluble organic solvent solutions. In Table 1, the symbol "O" denotes a good medium, and the symbol "X" denotes a poor medium.

TABLE 1

| Water-soluble organic solvent | Black pigment dispersion solution 1 | Black pigment dispersion solution 2 | Ka value of 20 mass % solution(mL/m$^2$/nsec$^{1/2}$) |
|---|---|---|---|
| Glycerin | O | O | 0.13 |
| Trimethylolpropane | O | O | 0.19 |
| Polyethylene glycol 600 | X | X | 0.17 |

[Preparation of Ink]

The components shown in Table 2 were mixed and stirred well. The mixture was filtered under pressure through a micro-filter (Fuji Film K.K.) of pore size of 3.0 μm. Thus Black inks BK1-BK9 were prepared.

TABLE 2

| | Black ink | | | | | | | | | | | | |
|---|---|---|---|---|---|---|---|---|---|---|---|---|---|
| | BK1 | BK2 | BK3 | BK4 | BK5 | BK6 | BK7 | BK8 | BK9 | BK10 | BK11 | BK12 | BK13 |
| Black pigment dispersion solution 1 | | | 50 | 50 | 50 | 50 | 50 | 50 | 50 | 50 | 50 | | |
| Black pigment dispersion solution 2 | 50 | 50 | | | | | | | | | | 50 | 10 |
| Glycerin | 10 | 5 | 8 | 6 | 3 | 10 | 15 | 10 | 5 | 10 | 5 | 7.5 | 10 |
| Trimethylolpropane | | | | | | | | | 7 | | | | |
| Polyethylene glycol 600 | 10 | 15 | 4 | 3 | 15 | 4 | | 5 | 10 | 4 | 15 | 15 | 4 |
| Acetylene glycol EO adduct* | 0.1 | 0.1 | 0.1 | 0.1 | 0.1 | 0.1 | 0.1 | 0.1 | 0.1 | 1 | 0.1 | 1 | 0.1 |
| Pure water | blc | blc | blc | blc | blc | blc | blc | blc | blc | blc | blc | blc | blc |

*Acetylenol E100
Kavaken Fine Chemical Co.
blc: Balance

[Preparation of Recorded Matter]

Recorded matters were prepared, in Examples 1-7, Reference Example 1, and Comparative Examples 1-4, by using the above-prepared BK inks in combination as shown in Table 3. For preparation of the recorded matters, an ink-jet recording apparatus BJF900 (Canon K.K.) was employed which has an on-demand type multiple recording head for ejecting an ink by thermal energy in accordance with recording signals.

The printer driver was driven by a default mode. The default mode conditions were as follows.

Kind of paper: Plain paper

Printing quality: Standard

Color adjustment: Automatic

The copying paper sheets below were used as the recording medium after conditioning at 23° C. and humidity 40% for 24 hours.

PPC paper PB paper (Canon K.K.)

PPC paper SC250C (Canon K.K.)

PPC paper 4200 (Xerox Co.)

PPC paper 4024 (Xerox Co.)

Super White Paper SW-101 (Canon K.K.)

HP Bright White IJ Paper (Hewlett Packard Co.)

Example 1

In, Example 1, a recorded matter was prepared with combination of the inks of BK1 and BK6. Ink BK1 was placed at the position of the black ink, and ink BK6 was placed at the position of the photocyan ink in the recording apparatus. A solid image of 5 cm×5 cm was printed by changing the duty in steps of 10% duty up to 100% duty. The printing signals were set to use BK6 for the duties of 20% or less, BK6 and BK1 for the duties from 30% or more to 70% or less, and BK1 for the duties of 80% or more.

Example 2

In Example 2, a recorded matter was prepared in the same manner as above with the inks of BK2 and BK6 in combination. Ink BK2 was placed at the position of the black ink, and ink BK6 was placed at the position of the photocyan ink in the recording apparatus. The printing signals were set to use BK6 for the duties of 20% or less, BK6 and BK2 for the duties from 30% or more to 70% or less, and BK2 for the duties of 80% or more.

Example 3

In Example 3, a recorded matter was prepared in the same manner as above with the inks of BK3 and BK6 in combination. Ink BK3 was placed at the position of the black ink, and ink BK6 was placed at the position of the photocyan ink in the recording apparatus. The printing signals were set to use BK6 for the duties of 20% or less, BK6 and BK3 for the duties from 30% or more to 70% or less, and BK3 for the duties of 80% or more.

Example 4

In Example 4, a recorded matter was prepared in the same manner as above with the inks of BK4 and BK7 in combination. Ink BK4 was placed at the position of the black ink, and ink BK7 was placed at the position of the photocyan ink in the recording apparatus. The printing signals were set to use BK7 for the duties of 20% or less, BK7 and BK4 for the duties from 30% or more to 70% or less, and BK4 for the duties of 80% or more.

Example 5

In Example 5, a recorded matter was prepared in the same manner as above with the inks of BK2 and BK7 in combination. Ink BK2 was placed at the position of the black ink, and ink BK7 was placed at the position of the photocyan ink in the recording apparatus. The printing signals were set to use BK7 for the duties of 20% or less, BK7 and BK2 for the duties from 30% or more to 70% or less, and BK2 for the duties of 80% or more.

Example 6

In Example 6 a recorded matter was prepared in the same manner as above with the inks of BK8 and BK6 in combination. Ink BK8 was placed at the position of the black ink, and ink BK6 was placed at the position of the photocyan ink in the recording apparatus. The printing signals were set to use BK6 for the duties of 20% or less, BK6 and BK8 for the duties from 30% or more to 70% or less, and BK8 for the duties of 80% or more.

Example 7

In Example 7, a recorded matter was prepared in the same manner as above with the inks of BK4 and BK10 in combination. Ink BK4 was placed at the position of the black ink, and ink BK10 was placed at the position of the photocyan ink in the recording apparatus. The printing signals were set to use BK10 for the duties of 20% or less, BK10 and BK4 for the duties from 30% or more to 70%, or less, and BK4 for the duties of 80% or more.

Example 8

In Example 8, a recorded matter was prepared in the same manner as above with the inks of BK11 and BK12 in combination. Ink BK11 was placed at the position of the black ink, and ink BK12 was placed at the position of the photocyan ink in the recording apparatus. The printing signals were set to use BK12 for the duties of 20% or less, BK12 and BK11 for the duties from 30% or more to 70% or less, and BK11 for the duties of 80% or more.

Example 9

In Example 9, a recorded matter was prepared in the same manner as above with the inks of BK11 and BK13 in combination. Ink BK11 was placed at the position of the black ink, and ink BK13 was placed at the position of the photocyan ink in the recording apparatus. The printing signals were set to use BK13 for the duties of 20% or less, BK13 and BK11 for the duties from 30% or more to 70% or less, and BK11 for the duties of 80% or more.

Reference Example 1

In Reference Example 1, a recorded matter was prepared in the same manner as above with ink BK2. Ink BK2 was placed at the respective positions of the black ink and the photocyan ink in the recording apparatus. The printing was conducted by use of ink BK2 at each of the duty levels.

Comparative Example 1

In Comparative Example 1, a recorded matter was prepared in the same manner as above with the inks of BK2 and BK6 in combination. Ink BK2 was placed at the position of the black ink, and ink BK6 was placed at the position of the photocyan ink in the recording apparatus. The printing signals were set to use BK2 for the duties of 20% or less, BK2 and BK6 for the duties from 30% or more to 70% or less, and BK6 for the duties of 80% or more.

Comparative Example 2

In Comparative Example 2, a recorded matter was prepared in the same manner as above with ink BK6. Ink BK6 was placed at the respective positions of the black ink and the photocyan ink in the recording apparatus. The printing was conducted by use of ink BK6 for each of the duties.

Comparative Example 3

In Comparative Example 3, a recorded matter was prepared in the same manner as above with the inks of BK3 and BK6 in combination. Ink BK3 was placed at the position of the black ink, and ink BK6 was placed at the position of the photocyan ink in the recording apparatus. The printing signals were set to use BK3 for the duties of 20% or less, BK3 and BK6 for the duties from 30% or more to 70% or less, and BK6 for the duties of 80% or more.

Comparative Example 4

In Comparative Example 4, a recorded matter was prepared in the same manner as above with the inks of BK2 and BK9 in combination. Ink BK9 was placed at the position of the black ink, and ink BK2 was placed at the position of the photocyan ink in the recording apparatus. The printing signals were set to use BK2 for the duties of 20% or less, BK2 and BK9 for the duties from 30% or more to 70% or less, and BK9 for the duties of 80% or more.

TABLE 3

| Black ink | Example | | | | | | | | | Ref Ex | Comparative Example | | | |
|---|---|---|---|---|---|---|---|---|---|---|---|---|---|---|
| | 1 | 2 | 3 | 4 | 5 | 6 | 7 | 8 | 9 | 1 | 1 | 2 | 3 | 4 |
| BK1 | ○ | | | | | | | | | | | | | |
| BK2 | | ○ | | | ○ | | | | | ○ | ○ | | | ○ |
| BK3 | | | ○ | | | | | | | | | | ○ | |
| BK4 | | | | ○ | | | ○ | | | | | | | |
| BK5 | | | | | | | | | | | | | | |
| BK6 | | ○ | ○ | ○ | | ○ | | | | | ○ | ○ | ○ | |
| BK7 | | | | | ○ | ○ | | | | | | | | |

TABLE 3-continued

| Black ink | Example | | | | | | | | | Ref Ex | Comparative Example | | | |
|---|---|---|---|---|---|---|---|---|---|---|---|---|---|---|
| | 1 | 2 | 3 | 4 | 5 | 6 | 7 | 8 | 9 | 1 | 1 | 2 | 3 | 4 |
| BK8 | | | | | | ○ | | | | | | | | |
| BK9 | | | | | | | | | | | | | | ○ |
| BK10 | | | | | | | | ○ | | | | | | |
| BK11 | | | | | | | | | ○ | ○ | | | | |
| BK12 | | | | | | | | | | ○ | | | | |
| BK13 | | | | | | | | | ○ | | | | | |

Ref Ex: Reference Example

[Evaluation]

1. Image Density

The recorded matters prepared in Examples 1-7, Reference Example 1, and Comparative Examples 1-4, after storage for one day, were subjected to image density measurement in the 100%-duty area. The image density was measured by means of a reflection-density meter (trade name: Macbeth RD-918; Macbeth Co.). The evaluation standard for the image density is shown below. Table 4 shows the results of the evaluation.

AA: Sufficient image density is achievable on all of the tested paper sheets.
A: Sufficient image density is not achievable on some kinds of the tested paper sheets, but no problem is caused practically.
B: Sufficient image density is not achievable on some kinds of the tested paper sheets.
C: Image density is not sufficient on all kinds of the tested paper sheets.

2. Graininess

The recorded matters prepared in Examples 1-7, Reference Example 1, and Comparative Examples 1-4, after storage for one day, were observed and evaluated visually for graininess at the highlight area (portions of 10% duty and 20% duty). The evaluation standard for the graininess is shown below. Table 4 shows the results of the evaluation.

AA: No graininess is observed on all of the tested paper sheets.
A: Slight graininess is observed on some tested paper sheets, but no problem is caused practically.
B: Graininess is observed on some tested paper sheets.
C: Graininess is remarkable on all of the tested paper sheets.

TABLE 4

| | | Print density | Graininess |
|---|---|---|---|
| Example | 1 | AA | A |
| | 2 | AA | A |
| | 3 | AA | A |
| | 4 | A | AA |
| | 5 | AA | AA |
| | 6 | AA | A |
| | 7 | A | AA |
| | 8 | AA | AA |
| | 9 | A | AA |
| Reference Example | 1 | AA | B |
| Comparative Example | 1 | B | B |
| | 2 | B | A |
| | 3 | B | B |
| | 4 | B | B |

In comparison of the image densities of the recorded matters obtained in Example 3 and Example 6, the image density of the recorded matter is more satisfactory which employs BK8 having the same ratio of the poor medium to the pigment.

3. Gradation

The recorded matters prepared in Examples 1-7, Reference Example 1, Comparative Examples 1-4, after storage for one day, were observed and evaluated visually for gradation of the images. As the results, the images obtained in Examples 1-7 had sufficient gradation in comparison with the images of Reference Example 1 and Comparative Examples 1-4. In particular, the image gradation was excellent in the images obtained in Example 3 and Example 5 in which the difference is larger between the ratio of the poor medium and the good medium (B/A) in the first aqueous ink and the ratio of the poor medium and the good medium (B/A) in the second aqueous ink.

4. Storage Stability

The inks BK1-BK10 were respectively enclosed tightly in shot bottles, and stored in an oven at 60° C. for two weeks. Then the state of the ink was observed. The evaluation standard for the storage stability is shown below. Table 5 shows the evaluation results.

A: The coloring material is kept dispersed uniformly and stably.
B: The ink becomes gelled, the top portion of the ink becomes transparent, or the viscosity of the ink becomes significantly higher.

TABLE 5

| Black ink | Storage stability |
|---|---|
| BK1 | A |
| BK2 | A |
| BK3 | A |
| BK4 | A |
| BK5 | B |
| BK6 | A |
| BK7 | A |
| BK8 | A |
| BK9 | A |
| BK10 | A |
| BK11 | A |
| BK12 | A |
| BK13 | A |

[Evaluation of Image Formed by Two-Liquid System]

(Preparation of Reactive Solution)

The components below were mixed and stirred sufficiently. The mixture was filtered under pressure (pressure: 0.4 MPa) through a micro-filter of 1-μm pore size (trade name: FR100; Fuji Film Co.). to prepare a reaction liquid.

| Magnesium nitrate (hexahydrate) | 9.0 mass % |
| Trimethylolpropane | 15.0 mass % |
| Glycerin | 5.0 mass % |
| Diethylene glycol | 5.0 mass % |
| Acetylenol EH (acetylene glycol-ethylene oxide adduct: (Kawaken Fine Chemical K.K.) | 1.0 mass % |
| Pure water | 65.0 mass % |

(Preparation of Recorded Matter)

Recorded matters were prepared in Example 10 and Comparative Example 5 by using the above-prepared BK inks in combination as shown in Table 6. For preparation of the recorded matters, an ink-jet recording apparatus BJF900 (Canon K.K. was employed which has an on-demand type multiple recording head for ejecting ink by thermal energy in accordance with recording signals. The recording apparatus had been modified to have a mechanism for applying a reaction liquid by an application roller to a recording medium as shown in FIG. 1. Specifically, the reaction liquid was applied onto a recording sheet. After fixation of the reaction liquid on the recording medium, the respective inks were applied onto the recording sheet to form an image. The reaction liquid was applied in an amount of 2.4 g/m² by adjusting the roller rotation rate and the roller pressure against the recording medium.

The printer driver was driven by a default mode. The default mode conditions were as follows.

Kind of paper: Plain paper sheet
Printing quality: Standard
Color adjustment: Automatic The copying paper below were used as the recording medium after conditioning at 23° C. and humidity 40% for 24 hours.

PPC paper PB paper (Canon K.K.)
PPC paper SC250C (Canon K.K.)
PPC paper 4200 (Xerox Co.)
PPC paper 4024 (Xerox Co.)
Super White Paper SW-101 (Canon K.K.)
HP Bright White IJ Paper (Hewlett Packard Co.)

Example 10

In Example 10, a recorded matter was prepared in the same manner as above with the inks of BK2 and BK6 in combination. Ink BK2 was placed at the position of the black ink, and ink BK6 was placed at the position of the photocyan ink in the recording apparatus. The printing signals were set to use BK6 for duties of 20% or less, BK6 and BK2 for the duties from 30% or more to 70% or less, and BK2 for the duties of 80% or more.

Comparative Example 5

In Comparable Example 5, a recorded matter was prepared in the same manner as above with the inks of BK2 and BK6 in combination. Ink BK2 was placed at the position of the black ink, and ink BK6 was placed at the position of the photocyan ink in the recording apparatus. The printing signals were set to use BK2 for duties of 20% or less, BK2 and BK6 for the duties from 30% or more to 70% or less, and BK6 for the duties of 80% or more.

TABLE 6

| Black ink | Example 10 | Comparative Example 5 |
|---|---|---|
| BK1 | | |
| BK2 | ○ | ○ |
| BK3 | | |
| BK4 | | |
| BK5 | | |
| BK6 | ○ | ○ |
| BK7 | | |
| BK8 | | |
| BK9 | | |
| BK10 | | |
| BK11 | | |
| BK12 | | |
| BK13 | | |

[Evaluation]

The recorded matters prepared in Example 10 and Comparative Example 5 above was evaluated for the image density, the graininess, and the gradation in the same manner as above.

Regarding the image density, the image formed in Example 8 had higher image density than that formed in Comparative Example 5. Regarding the graininess and the gradation, the image formed in Example 8 is satisfactory in comparison with that formed in Comparative Example 5.

This application claims priority from Japanese Patent Application No. 2004-190546 filed on Jun. 28, 2004, which is hereby incorporated by reference herein.

What is claimed is:

1. A recording method using a first aqueous ink for higher-density recording and a second aqueous ink for lower-density recording,
    wherein the first aqueous ink comprises at least water, a water-insoluble coloring material, and plurality of water-soluble organic solvents,
    wherein the plurality of water-soluble organic solvents includes a good medium or good mediums for the water-insoluble coloring material and a poor medium or poor mediums for the water-insoluble coloring material,
    wherein the ratio B/A in the second aqueous ink is less than the ratio B/A in the first aqueous ink, where A denotes the total content (mass %) of good medium based on the total mass of the aqueous ink and B denotes the total content (mass %) of poor medium based on the total mass of the aqueous ink, and
    wherein the second aqueous ink has the same hue as the first aqueous ink.

2. The recording method according to claim 1, wherein, in the first aqueous ink, the ratio of $A_1:B_1$ (where $A_1$ denotes a total content (mass %) of the good medium based on the total mass of the first aqueous ink and $B_1$ denotes a total content (mass %) of the poor medium based on the total mass of the first aqueous ink) ranges from 10:5 or more to 10:30 or less, and
    wherein a water-soluble organic solvent which shows the maximum Ka value among the respective Ka values of the plurality of water-soluble organic solvents as determined by the Bristow method is the poor medium.

3. The recording method according to claim 1, wherein, in the second aqueous ink, the ratio of $A_2:B_2$ (where $A_2$ denotes a total content (mass %) of the good medium based on the total mass of the second aqueous ink and $B_2$ denotes a total content (mass %) of the poor medium based on the total mass of the second aqueous ink) is less than 10:5.

4. The recording method according to claim 1, wherein in the first aqueous ink, the total content (mass %) of the poor medium is 4 mass % or more based on the total mass of the first aqueous ink.

5. The recording method according to claim 1, wherein, in the first aqueous ink, the water-insoluble coloring material is a self-dispersion organic pigment or a self-dispersion carbon black, having at least one kind of hydrophilic groups bonded directly or via another kind of atomic groups bonded to the surface of the water-insoluble coloring material.

6. The recording method according to claim 1, wherein the first aqueous ink and/or the second aqueous ink further comprises a compound having a structure shown by any of Structural Formulae (1) to (4):

Structural Formula (1)

(1)

(where R represents an alkyl, and n represents an integer),
Structural Formula (2)

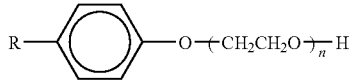

(2)

(where R represents an alkyl, and n represents an integer),
Structural Formula (3)

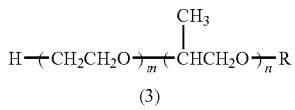

(3)

(where R represents a hydrogen atom or an alkyl; and m and n represent respectively an integer),
Structural Formula (4)

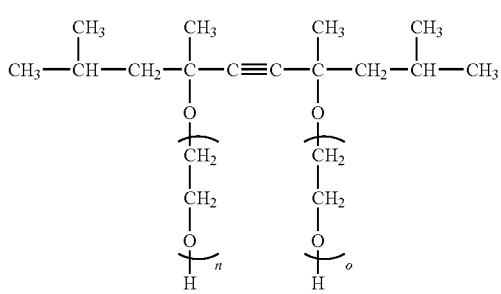

(4)

(where m and n represent respectively an integer).

7. The recording method according to claim 1, wherein the first aqueous ink is an ink-jet ink and the second aqueous ink is an ink-jet ink.

8. An ink cartridge comprising an ink holding member containing an ink therein, wherein the ink is the first aqueous ink or the second aqueous ink set forth in claim 1.

9. The recording method according to claim 1, which is applied to carrying out a recording to a recording medium consisting of one page.

10. The recording method according to claim 1, wherein a recording density for determining the kind of ink to be used is determined by a mass of the ink to be applied to a unit area.

11. The recording method according to claim 1, wherein the first aqueous ink and the second aqueous ink are used in combination for intermediate-density recording.

12. A recording method using a first aqueous ink for higher-density recording and a second aqueous ink for lower-density recording, characterized in that the first aqueous ink comprises at least water, a water-insoluble coloring material, and plurality of water-soluble organic solvents, and wherein the plurality of water-soluble organic solvents including a good medium or good mediums for the water-insoluble coloring material and a poor medium or poor mediums for the water-insoluble coloring material, and wherein the ratio B/A in the second aqueous ink being less than the ratio B/A in the first aqueous ink, where A denotes the total content (mass %) of good medium based on the total mass of the aqueous ink and B denotes the total content (mass %) of poor medium based on the total mass of the aqueous ink, and wherein the second aqueous ink has the same hue as the first aqueous ink, and wherein a water-soluble organic solvent which shows the maximum Ka value among the respective Ka values of the plurality of water-soluble organic solvents as determined by the Bristow method is the poor medium; and wherein the poor medium or the poor mediums permeates into the recording medium ahead of the good medium or the good mediums and the poor medium or poor mediums to promote flocculation of the water-insoluble coloring material in the good medium or the good mediums at the surface side of the recording medium.

* * * * *